(12) United States Patent
Zhang et al.

(10) Patent No.: US 12,400,639 B2
(45) Date of Patent: Aug. 26, 2025

(54) SPEECH PROCESSING METHOD, SPEECH ENCODER, SPEECH DECODER AND SPEECH RECOGNITION SYSTEM

(71) Applicant: Alibaba Group Holding Limited, George Town (KY)

(72) Inventors: Shiliang Zhang, Hangzhou (CN); Zhifu Gao, Hangzhou (CN); Ming Lei, Hangzhou (CN)

(73) Assignee: Alibaba Group Holding Limited (KY)

( * ) Notice: Subject to any disclaimer, the term of this patent is extended or adjusted under 35 U.S.C. 154(b) by 391 days.

(21) Appl. No.: 17/951,569

(22) Filed: Sep. 23, 2022

(65) Prior Publication Data

US 2023/0009633 A1   Jan. 12, 2023

Related U.S. Application Data

(63) Continuation of application No. PCT/CN2021/081457, filed on Mar. 18, 2021.

(30) Foreign Application Priority Data

Mar. 25, 2020  (CN) ......................... 202010219957.0

(51) Int. Cl.
*G10L 15/16* (2006.01)
*G10L 15/02* (2006.01)
*G10L 15/18* (2013.01)

(52) U.S. Cl.
CPC .............. *G10L 15/16* (2013.01); *G10L 15/02* (2013.01); *G10L 15/1815* (2013.01)

(58) Field of Classification Search
CPC ..... G10L 15/16; G10L 15/02; G10L 15/1815; G10L 15/26; G06F 40/30
USPC ......................................................... 704/232
See application file for complete search history.

(56) References Cited

U.S. PATENT DOCUMENTS 9,202,465 B2 * 12/2015 Talwar .................... G10L 15/30
9,633,671 B2 *  4/2017 Giacobello ......... G10L 21/0208
9,881,616 B2 *  1/2018 Beckley ................. G10L 15/20
10,255,273 B2 *  4/2019 Chakraborty ....... G06F 16/3344
(Continued)

FOREIGN PATENT DOCUMENTS

CN     109933773 A  *  6/2019
CN     110288975 A  *  9/2019  .......... G10L 15/065
(Continued)

*Primary Examiner* — Edwin S Leland, III
(74) *Attorney, Agent, or Firm* — Lee & Hayes, P.C.

(57) ABSTRACT

A speech processing method, a speech encoder, a speech decoder, and a speech recognition system are provided. The method includes: obtaining a speech signal to be processed; using a first neural network and a second neural network to process the speech signal to obtain first feature information and second feature information corresponding to the speech signal respectively, wherein a computational efficiency of the first neural network is higher than a computational efficiency of the second neural network, and an accuracy of the second feature information outputted by the second neural network is higher than an accuracy of the first feature information outputted by the first neural network; and determining target feature information used to represent semantics in the speech signal based on the first feature information and the second feature information.

18 Claims, 20 Drawing Sheets

(56) References Cited

U.S. PATENT DOCUMENTS

| | | | | |
|---|---|---|---|---|
| 10,475,467 | B2* | 11/2019 | Levitt | G10L 21/013 |
| 11,056,097 | B2* | 7/2021 | Short | G10L 25/21 |
| 11,508,381 | B2* | 11/2022 | Li | G10L 17/18 |
| 11,610,102 | B1* | 3/2023 | Zejda | G06N 3/063 |
| 2018/0365220 | A1* | 12/2018 | Chakraborty | G06F 40/30 |
| 2020/0043483 | A1* | 2/2020 | Prabhavalkar | G10L 15/16 |
| 2020/0175993 | A1* | 6/2020 | Cho | G10L 17/20 |
| 2020/0372396 | A1* | 11/2020 | Kozhaya | G06N 20/00 |
| 2020/0410054 | A1* | 12/2020 | Kumar | G06F 40/30 |
| 2022/0148571 | A1* | 5/2022 | Wang | G10L 21/02 |
| 2022/0172707 | A1* | 6/2022 | Wang | G10L 15/063 |
| 2023/0009633 | A1* | 1/2023 | Zhang | G10L 15/1815 |

FOREIGN PATENT DOCUMENTS

| | | | | |
|---|---|---|---|---|
| CN | 110428849 A | * | 11/2019 | G10L 21/0216 |
| CN | 110600017 A | * | 12/2019 | G10L 21/0208 |
| CN | 112639828 A | * | 4/2021 | |
| EP | 3770840 A1 | * | 1/2021 | G06V 10/82 |
| WO | WO-2021190389 A1 | * | 9/2021 | G10L 15/1815 |

\* cited by examiner

SPEECH PROCESSING METHOD, SPEECH ENCODER, SPEECH DECODER AND SPEECH RECOGNITION SYSTEM

CROSS REFERENCE TO RELATED PATENT APPLICATIONS

This application claims priority to and is a continuation of PCT Patent Application No. PCT/CN2021/081457 filed on 18 Mar. 2021, and is related to and claims priority to Chinese Application No. 202010219957.0, filed on 25 Mar. 2020 and entitled "Speech Processing method, Speech Encoder, Speech Decoder and Speech Recognition System," which are incorporated herein by reference in their entirety.

TECHNICAL FIELD

The present disclosure relates to the technical field of data processing, and in particular, to speech processing methods, speech encoders, speech decoders, and speech recognition systems.

BACKGROUND

Speech recognition technology can convert human speech waveforms into text that can be recognized by machines. For speech recognition technology, the speech recognition rate is an important indicator for evaluating speech recognition performance. In 2017, Google proposed a Transformer model that can perform speech recognition. Specifically, the Transformer model can use a text-related self-attention mechanism to model the long-term dependence of speech to obtain a speech recognition model, and speech recognition operations are then realized through the established speech recognition model.

However, when the Transformer model uses the text-related self-attention mechanism to model the long-term dependence of speech, due to the large number of text-related parameters, the complexity of building a speech recognition model is relatively high, which also increases the difficulty of optimizing the speech recognition model, thus greatly affecting the quality and efficiency of speech signal recognition.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a speech processing method, a speech encoder, a speech decoder, and a speech recognition system, which can not only reduce the complexity of processing speech signals, but also improve the quality and efficiency of speech signal recognition.

In implementations, the present disclosure provides a speech processing method, which includes:
  obtaining a speech signal to be processed;
  using a first neural network to process the speech signal to obtain first feature information corresponding to the speech signal, wherein the first feature information is used to identify semantics in the speech signal;
  using a second neural network to process the speech signal to obtain second feature information corresponding to the speech signal, wherein the second feature information is used to identify the semantics in the speech signal, wherein the second feature information is different from the first feature information; and
  determining target feature information for representing the semantics in the speech signal based on the first feature information and the second feature information.

In implementations, the present disclosure provides a speech encoder, which includes:
  a first acquisition unit used for obtaining a speech signal to be processed;
  a first processing unit used for using a first neural network to process the speech signal to obtain first feature information corresponding to the speech signal, wherein the first feature information is used to identify semantics in the speech signal;
  the first processing unit further used for using a second neural network to process the speech signal to obtain second feature information corresponding to the speech signal, wherein the second feature information is used to identify the semantics in the speech signal, wherein the second feature information is different from the first feature information; and
  a first determination unit used for determining target feature information for representing the semantics in the speech signal based on the first feature information and the second feature information.

In implementations, the present disclosure provides an electronic device, which includes: a memory and a processor; wherein the memory is used to store one or more computer instructions, wherein the one or more computer instructions, when executed by the processor, implement the speech processing method as described above.

In implementations, the present disclosure provides a computer storage medium used for storing a computer program, and the computer program enables a computer to implement the speech processing method as described above when executed.

In implementations, the present disclosure provides a speech processing method, which includes:
  receiving target feature information sent by an encoder, wherein the target feature information corresponds to a speech signal;
  obtaining historical prediction information; and
  processing the target feature information using a multi-head attention mechanism and the historical prediction information to obtain text information corresponding to the speech signal.

In implementations, the present disclosure provides a speech decoder, which includes:
  a second receiving module used for receiving target feature information sent by an encoder, wherein the target feature information corresponds to a speech signal;
  a second acquisition module used for obtaining historical prediction information; and
  a second processing module used for processing the target feature information using a multi-head attention mechanism and the historical prediction information to obtain text information corresponding to the speech signal.

In implementations, the present disclosure provides an electronic device, which includes: a memory and a processor; wherein the memory is used to store one or more computer instructions, wherein the one or more computer instructions, when executed by the processor, implement the speech processing method as described above.

In implementations, the present disclosure provides a computer storage medium for storing a computer program, and the computer program enables the computer to implement the speech processing method as described above when executed.

In implementations, the present disclosure provides a speech recognition system, which includes:
the speech encoder according to the second aspect, which is configured to perform data dimension reduction processing on an obtained speech signal to obtain speech feature information corresponding to the speech signal.

In implementations, the present disclosure provides a data processing method, which includes:
obtaining a speech signal to be processed;
separately using a first neural network and a second neural network to process the speech signal to obtain first feature information and second feature information corresponding to the speech signal, wherein a computational efficiency of the first neural network is higher than a computational efficiency of the second neural network, an accuracy of the second feature information outputted by the second neural network is higher than an accuracy of the first feature information outputted by the first neural network; and
determining target feature information for representing semantics in the speech signal based on the first feature information and the second feature information.

In implementations, the present disclosure provides a speech encoder, which includes:
a third acquisition module used for obtaining a speech signal to be processed;
a third processing module used for separately using a first neural network and a second neural network to process the speech signal to obtain first feature information and second feature information corresponding to the speech signal, wherein a computational efficiency of the first neural network is higher than a computational efficiency of the second neural network, an accuracy of the second feature information outputted by the second neural network is higher than an accuracy of the first feature information outputted by the first neural network; and
a third determination module used for determining target feature information for representing semantics in the speech signal based on the first feature information and the second feature information.

In implementations, the present disclosure provides an electronic device, which includes: a memory and a processor; wherein the memory is used to store one or more computer instructions, wherein the one or more computer instructions, when executed by the processor, implement the speech processing method as described above.

In implementations, the present disclosure provides a computer storage medium for storing a computer program, and the computer program enables the computer to implement the speech processing method as described above when executed.

In implementations, the present disclosure provides a speech recognition system, which includes:
the speech encoder according to the eleventh aspect, which is configured to perform data dimension reduction processing on an obtained speech signal to obtain speech feature information corresponding to the speech signal.

In the speech processing methods, speech encoders, speech decoders and speech recognition systems provided in the embodiments of the present disclosure, a first neural network is used to process an obtained speech signal to obtain first feature information, and a second neural network is used to process the obtained speech signal. Since the first neural network and the second neural network are different, the first feature information and the second feature information that is obtained is complementary to each other in terms of efficiency and quality of speech processing, Based on the first feature information and the second feature information, target feature information used to represent semantics in the speech signal is then determined. This effectively ensures the quality of obtaining the target feature information, and further improves the quality of processing the speech signal and efficiency, thus ensuring the practicality of the methods.

BRIEF DESCRIPTION OF THE DRAWINGS

In order to more clearly illustrate the technical solutions in the embodiments of the present disclosure, the accompanying drawings that need to be used for describing the embodiments are briefly introduced below. Apparently, the described drawings represent some embodiments of the present disclosure. For one of ordinary skill in the art, other drawings can also be obtained according to these drawings without making any creative effort.

DETAILED DESCRIPTION

Figure 1:
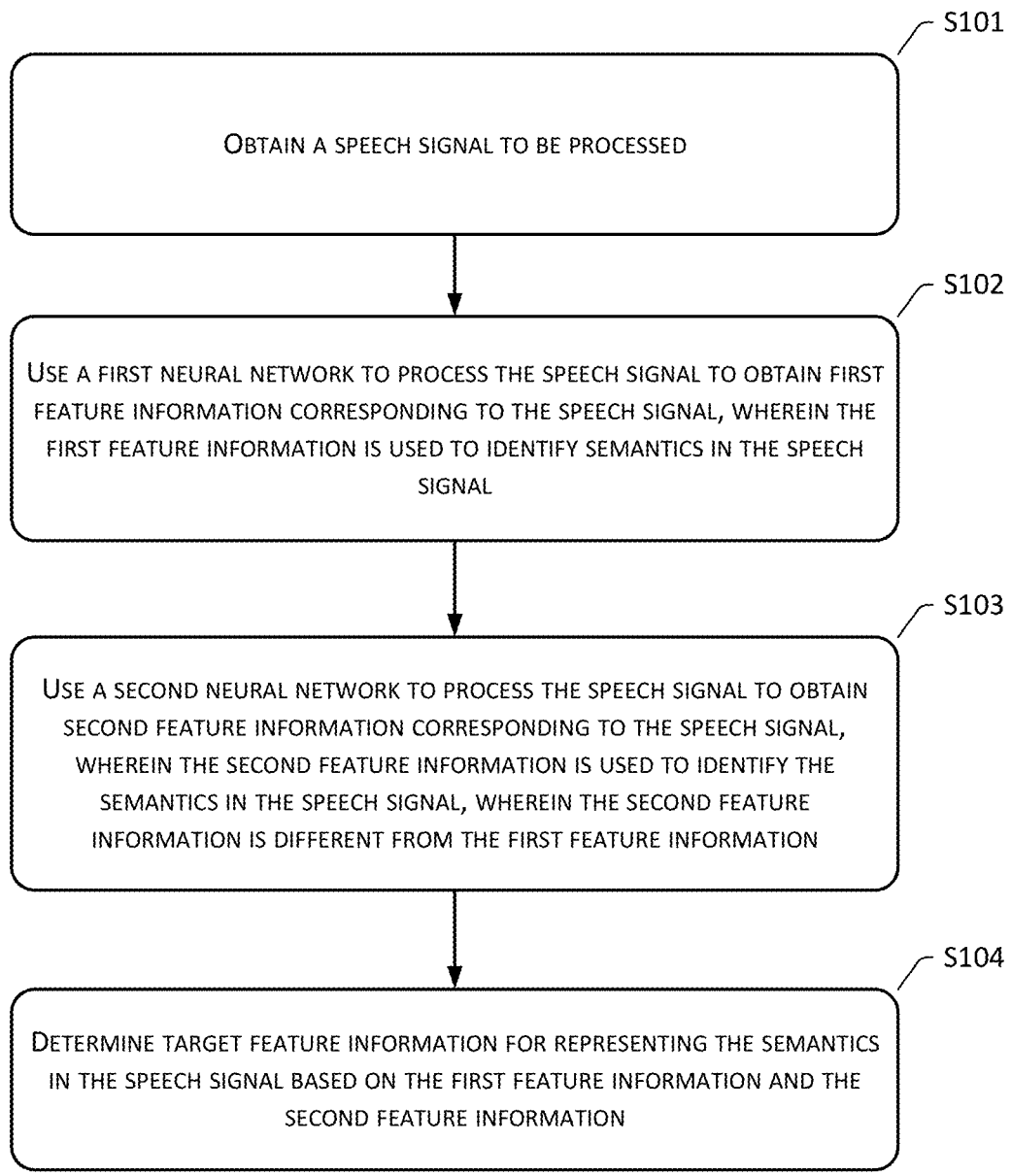
FIG. 1 is a schematic flowchart of a speech processing method provided by the present disclosure.

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Apparently, the described embodiments represent some but not all of the embodiments of the present disclosure. Based on the embodiments of the present disclosure, all other embodiments obtained by one of ordinary skill in the art without making any creative effort shall fall within the scope of protection of the present disclosure.

The terms used in the embodiments of the present disclosure are used for the purpose of describing specific embodiments only, and are not intended to limit the present disclosure. Singular forms "a," "said," and "the" used in the embodiments of the present disclosure and the appended claims are intended to include plural forms as well, unless clearly dictated by the context otherwise, "Multiple" generally includes at least two, but does not exclude at least one.

It should be understood that the term "and/or" used in this text is only an association relationship to describe associated objects, and indicates that there may be three kinds of relationships. For example, A and/or B may indicate that three situations: A exists alone, both A and B exists at the same time, and B exists alone. In addition, the character "/" in this text generally indicates that corresponding preceding and following objects that are associated have an "or" relationship.

Depending on the context, the terms "in case", "if" as used herein may be interpreted as "at" or "when" or "in response to determining" or "in response to detecting". Similarly, depending on the context, the phrases "if determining" or "if detecting (a stated condition or event)" can be interpreted as "when determining" or "in response to determining" or "when detecting (a stated condition or event)" or "in response to detecting (a stated condition or event)".

It should also be noted that the terms "comprising", "including" or any other variation thereof are intended to encompass a non-exclusive inclusion, such that a product or system including a list of elements not only includes those elements, but also includes other elements that are not explicitly listed, or elements that are inherent to the product or system. Without further limitation, an element defined by a phrase "comprising a . . . " does not preclude the presence of additional identical elements in the product or system that includes such element.

In addition, an order of steps in the following method embodiments is only an example, and is not strictly limited.

In order to facilitate the understanding of the technical solutions of the present application, technologies used herein are briefly described below:

The neural networks used in existing end-to-end speech recognition systems include: a recurrent neural network (LSTM-RNN) based on long and short-term memory units, a Transformer model based on self-attention mechanism, a deep feed-forward sequential memory network (abbreviated as DFSMN), etc., in which DFSMN is an improved FSMN network structure proposed on the basis of previous feed-forward sequential memory networks (Feedforward Sequential Memory Networks, abbreviated as FSMN).

Specifically, when a speech recognition system is built using the Transformer model, the Transformer model can use a text-related self-attention mechanism to perform speech modeling for the long-term dependence of speech, and obtain a speech recognition model, so as to realize speech recognition operations through the built speech recognition model. The long-term dependence of speech refers to the dependence among the content of a current speech signal, the content of speech signals at the past moments, and the content of speech signals at the future moments. In specific applications, the efficiency of speech recognition of the Transformer model is higher than that of the LSTM-RNN model, and the effect thereof is also better.

When a speech recognition system is built using the DFSMN model, the DFSMN model can use some text-independent filters to model the long-term dependence of speech to obtain a speech recognition model, so as to realize speech recognition operations through the built speech recognition model. Experiments in practical applications show that DFSMN can achieve better performance than Transformer for some clean speech, and the complexity is lower. However, for some poor quality speech, Transformer has an advantage in performance.

However, when using the Transformer model to model the long-term dependence of speech, since a relatively large number of text-related parameters exist, this thus greatly increases the complexity of building a speech recognition model and the difficulty of optimizing the speech recognition model. When using the DFSMN model to model the long-term dependence of speech, since there are fewer text-related parameters, the complexity of building a speech recognition model and the difficulty of optimizing the speech recognition model are greatly reduced, while also reducing the robustness of speech recognition at the same time.

Some embodiments of the present disclosure will be described in detail below with reference to the accompanying drawings. The following embodiments and features in the embodiments may be combined with each other when there is no conflict between the embodiments.

Figure 2:
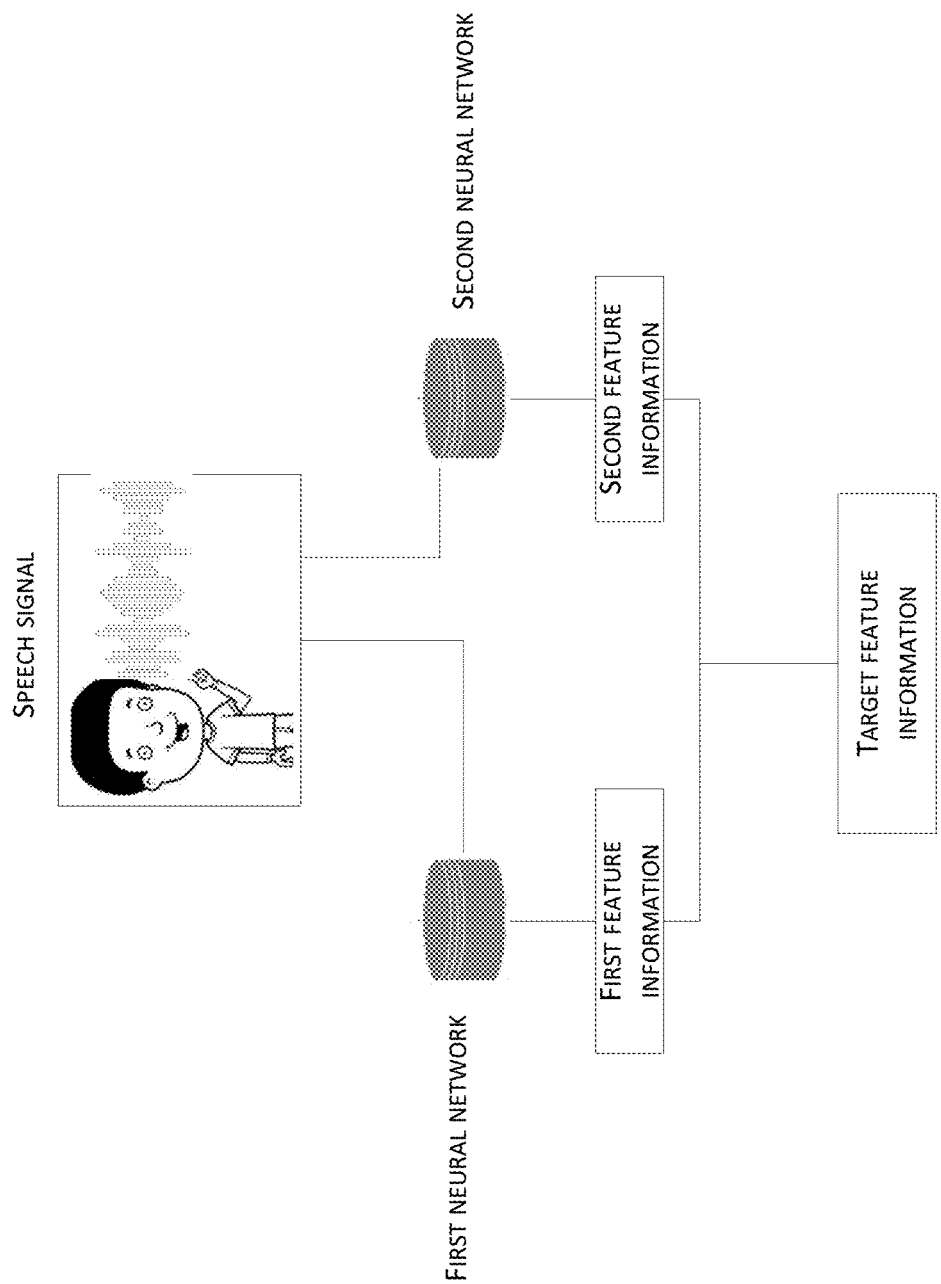
FIG. 2 is a schematic diagram of an application scenario of a speech processing method provided by the present disclosure.

FIG. 1 is a schematic flowchart of a speech processing method provided by the present disclosure. FIG. 2 is a schematic diagram of an application scenario of a speech processing method provided by the present disclosure. As FIGS. 1 and 2 shows, a speech processing method is provided to solve the aforementioned technical problems. An execution body of the method may be a speech processing apparatus. It is understood that the speech processing apparatus may be implemented as software or a combination of software and hardware. In specific applications, the speech processing apparatus may be a speech encoder. Such speech encoder can process a speech signal in real time to obtain feature information that is used to represent semantics in the speech signal. In implementations, the speech processing method may include:

Step S101: Obtain a speech signal to be processed.

Step S102: Use a first neural network to process the speech signal to obtain first feature information corresponding to the speech signal, wherein the first feature information is used to identify semantics in the speech signal.

Step S103: Use a second neural network to process the speech signal to obtain second feature information corresponding to the speech signal, wherein the second feature information is used to identify the semantics in the speech signal, wherein the second feature information is different from the first feature information.

Step S104: Determine target feature information for representing the semantics in the speech signal based on the first feature information and the second feature information.

The above steps are described in detail below:

Step S101: Obtain a speech signal to be processed.

The speech signal to be processed refers to a signal that needs to be recognized or processed. It can be understood that the above-mentioned speech signal may be speech information directly input by a user. For example, the speech processing apparatus may directly collect speech information input by a user, and thereby obtain a speech signal to be processed. Alternatively, the above-mentioned speech signal may be speech information sent by other devices. For example, speech information input by a user is collected by a speech collection unit, and the speech processing apparatus communicates with the speech collection unit. The speech processing apparatus can obtain a speech signal to be processed through the speech collection unit.

Step S102: Use a first neural network to process the speech signal to obtain first feature information corresponding to the speech signal, wherein the first feature information is used to identify semantics in the speech signal.

The first neural network may include any one of the following: a self-attention mechanism and a static memory network (Static Memory Network, SMN for short). It can be understood that the first neural network is not limited to the types of networks exemplified above, and one skilled in the art can also set the first neural network to other types of neural networks according to specific application requirements and design requirements. The first neural network may process a speech signal to obtain feature information for identifying semantics in the speech signal, which will not be repeated herein.

In addition, for a received speech signal, the speech signal includes a first signal for identifying speech semantics and a second signal for identifying user features. Specifically, the second signal is used to identify tone information of a user who inputs the speech signal, accent information of the user, a language type of the user, age information of the user, etc. In order to improve the quality and efficiency of processing the speech signals, after the speech signal is obtained, the first neural network can be used to process the speech signal, so as to obtain first feature information corresponding to the speech signal. The first feature information can be used to identify semantics included in the speech signal.

Step S103: Use a second neural network to process the speech signal to obtain second feature information corresponding to the speech signal, wherein the second feature information is used to identify the semantics in the speech signal, and the second feature information and the first feature information is different.

The second neural network may include any one of the following: a self-attention mechanism and a static memory network. It can be understood that, in order to make the second feature information different from the first feature information, the second neural network can be made to be different from the first neural network. For example, when the first neural network includes a self-attention mechanism, the second neural network may include a static memory network. When the first neural network includes a static memory network, the second neural network may include a self-attention mechanism.

It can be understood that the second neural network is not limited to the types of networks exemplified above, and one skilled in the art can also set the second neural network to other types of neural networks according to specific application requirements and design requirements, as long as it can be guaranteed that the second neural network is different from the first neural network, and the second neural network is enabled to process speech signals to obtain feature information for identifying the semantics in the speech signals, which is not repeated herein.

Similarly, since the speech signal includes a first signal for identifying speech semantics and a second signal for identifying user features, in order to improve the quality and efficiency of processing the speech signal, the speech signal can be processed by using the second neural network after the speech signal is obtained. As such, second feature information corresponding to the speech signal can be obtained, and the second feature information can be used to identify the semantics included in the speech signal. Since the second neural network is different from the first neural network, the second feature information obtained through the second neural network and the first feature information obtained through the first neural network is complementary to each other in terms of quality and efficiency of speech recognition.

Step S104: Determine target feature information for representing the semantics in the speech signal based on the first feature information and the second feature information.

After the first feature information and the second feature information is obtained, the first feature information and the second feature information may be analyzed and processed to determine target feature information that is used to represent the semantics in the speech signal. Specifically, based on the first feature information and the second feature information, determining the target feature information used to represent the semantics in the speech signal may include:

Step S1041: Determine a sum of the first feature information and the second feature information as the target feature information.

Since the first neural network and the second neural network are different, the efficiency and quality of processing the speech signal using the first neural network and the second neural network are complementary to each other. After obtaining the first feature information and the second feature information, a sum of the first feature information and the second feature information that is complementary to each other is determined as the target feature information. As the target feature information at this time includes a combination of the first feature information and the second feature information, this thereby effectively improves the quality and efficiency of recognizing the speech signal.

In the speech processing method provided in this embodiment, an obtained speech signal is processed by a first neural network to obtain first feature information, and a second neural network is used to process the obtained speech signal to obtain second feature information. Since the first neural network and the second neural network are different, the first feature information and the second feature information that is obtained is complementary to each other in terms of efficiency and quality of speech processing. Based on the first feature information and the second feature information, target feature information used to characterize semantics in the speech signal is determined. This thus effectively ensures the quality of obtaining the target feature information, and further improves the quality and efficiency of processing the speech signal, thus ensuring the practicability of the method.

Figure 3:
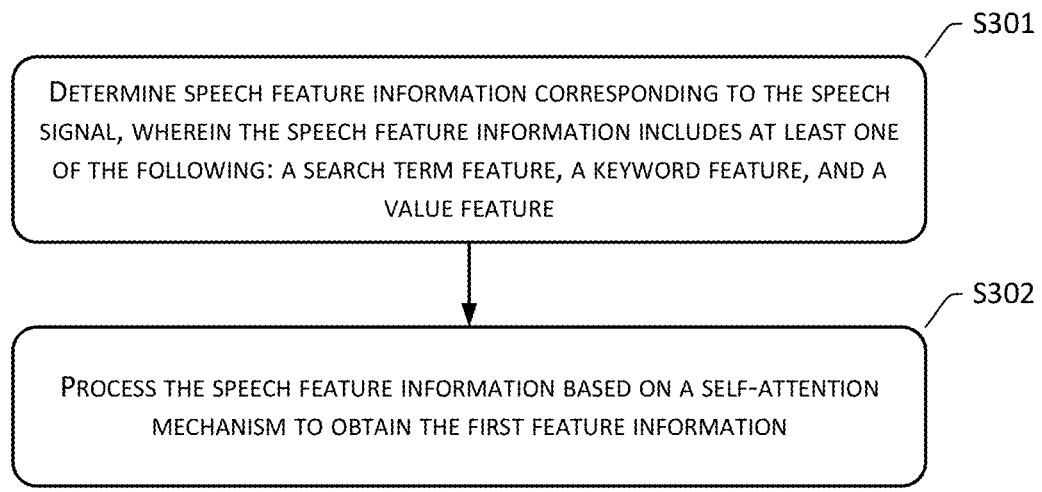
FIG. 3 is a schematic flowchart of processing a speech signal using a first neural network to obtain first feature information corresponding to the speech signal according to the present disclosure.

FIG. 3 is a schematic flowchart of processing a speech signal using a first neural network to obtain first feature information corresponding to a speech signal provided by the present disclosure. Continuing to refer to what is shown in FIG. 3, on the basis of the above embodiments, when the first neural network is used to process a speech signal, this embodiment does not limit a specific processing implementation method. One skilled in the art can perform setting according to specific application requirements and design requirements. In this embodiment, using the first neural network to process the speech signal to obtain the first feature information corresponding to the speech signal may include:

Step S301: Determine speech feature information corresponding to the speech signal, wherein the speech feature information includes at least one of the following: a search term feature, a keyword feature, and a value feature.

Step S302: Process the speech feature information based on a self-attention mechanism to obtain the first feature information.

In implementations, after a speech signal is obtained, the speech signal can be converted, so that speech feature information corresponding to the speech signal can be obtained. The speech feature information may include at least one of the following: a search term feature (query), a keyword feature (key) and a value feature (value). It can be understood that when different speech feature information is obtained, a handling process for converting the speech signal is also different.

For example, when the speech feature information includes a search term feature, obtaining the speech feature information may include: obtaining first conversion information corresponding to the search term feature, wherein the first conversion information may be a conversion matrix; and performing conversion processing on the speech signal using the first conversion information to obtain the search term feature.

When the speech feature information includes a search term feature and a keyword feature, obtaining the speech feature information may include: respectively obtaining first conversion information corresponding to the search term feature and second conversion information corresponding to the keyword feature, the first conversion information and the second conversion information may both be conversion matrices. It should be noted that the first conversion information is different from the second conversion information. Conversion processing is then performed on the speech signal using the second conversion information to obtain the keyword feature.

Similarly, when the speech feature information includes a search term feature, a keyword feature, and a value feature, obtaining the speech feature information may include: respectively obtaining first conversion information corresponding to the search term feature, second conversion information corresponding to the keyword feature, and third conversion information corresponding to the value feature. The first conversion information, the second conversion information and the third conversion information may all be conversion matrices. It should be noted that the first conversion information, the second conversion information and the third conversion information is different from each other. Then, conversion processing is performed on the speech signal using the first conversion information to obtain the search term feature, and conversion processing is performed on the speech signal using the second conversion information to obtain the keyword feature, and conversion processing is performed on the speech signal using the third conversion information to obtain the value feature.

After obtaining the speech feature information, a self-attention mechanism can be used to process the speech feature information to obtain the first feature information used to identify the semantics in the speech signal. It can be understood that the quality and the efficiency of the first feature information that is obtained will be better as the speech feature information includes more feature information.

In implementations, by determining speech feature information corresponding to a speech signal, and then processing the speech feature information based on a self-attention mechanism, this can not only accurately and effectively obtain first feature information, but also effectively increase the number of implementation ways for obtaining the first feature information because the speech feature information may include at least one of a search term feature, a keyword feature, and a value feature, thereby improving the flexibility and reliability of the method.

Figure 4:
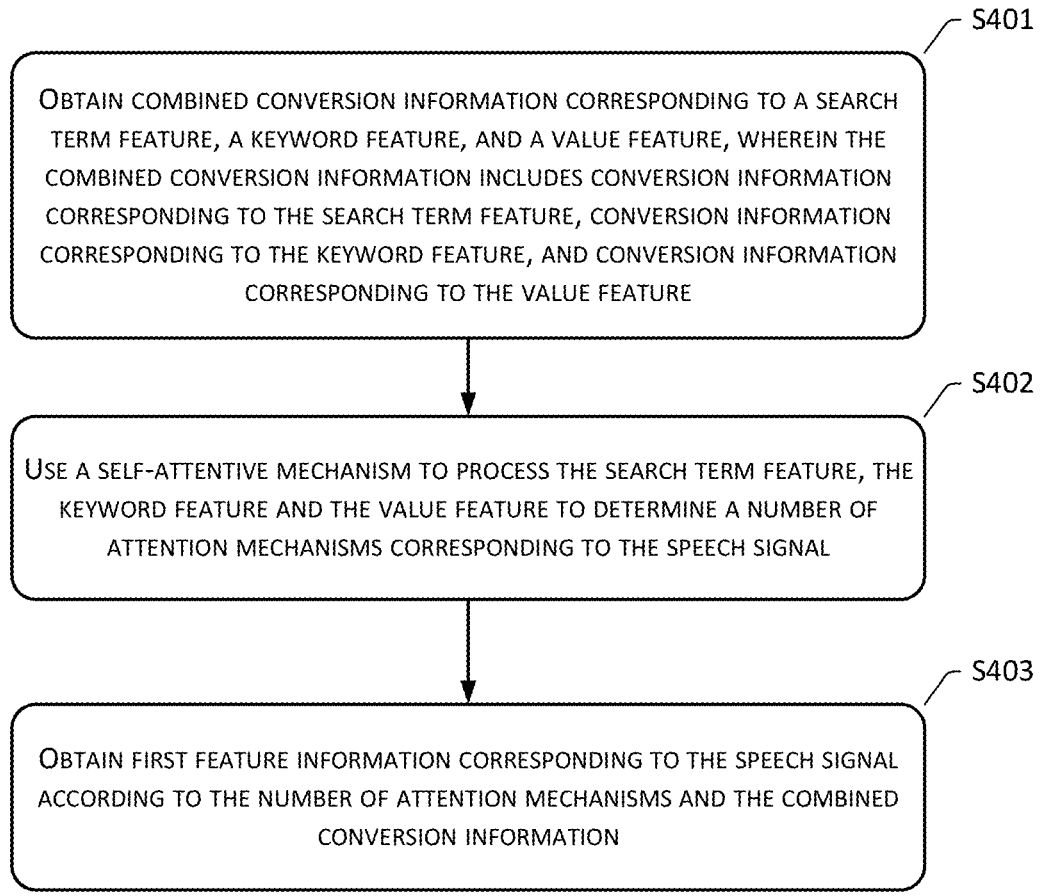
FIG. 4 is a schematic flowchart of processing speech feature information based on a self-attention mechanism to obtain first feature information provided by the present disclosure.

FIG. 4 is a schematic flowchart of processing speech feature information based on a self-attention mechanism to obtain first feature information provided by the present disclosure. On the basis of the above embodiments and with continued reference to what is shown in FIG. 4, this embodiment does not limit a specific implementation method for obtaining the first feature information. One skilled in the art can perform setting according to specific application requirements and design requirements. When the speech feature information includes: a search term feature, a keyword feature, and a value feature, in this embodiment, processing the speech feature information based on the self-attention mechanism to obtain the first feature information may include:

Step S401: Obtain combined conversion information corresponding to a search term feature, a keyword feature, and a value feature, wherein the combined conversion information includes conversion information corresponding to the search term feature, conversion information corresponding to the keyword feature, and conversion information corresponding to the value feature.

Figure 5:
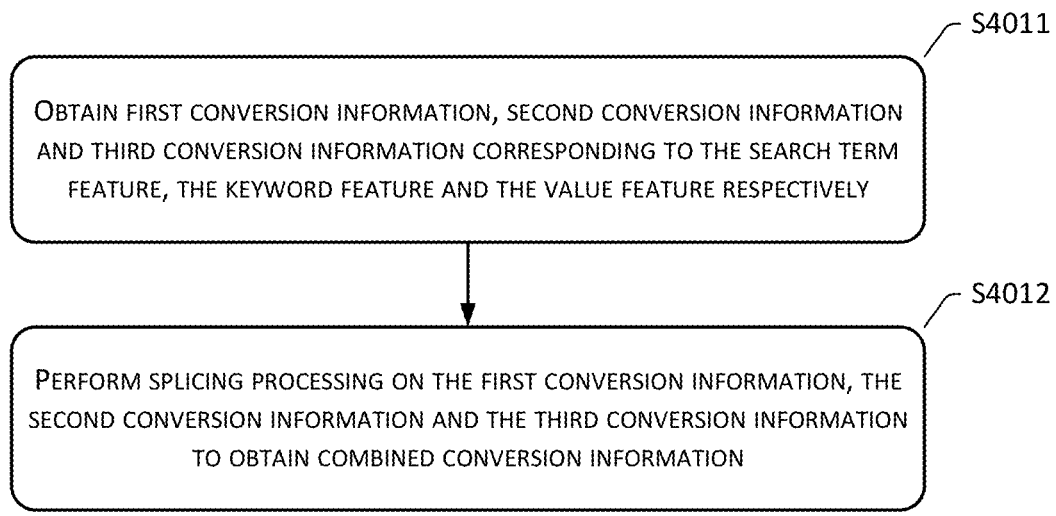
FIG. 5 is a schematic flowchart of obtaining combined conversion information corresponding to a search term feature, a keyword feature, and a value feature the present disclosure.

In implementations, referring to FIG. 5, obtaining the combined conversion information corresponding to the search term feature, the keyword feature and the value feature may include:

Step S4011: Obtain first conversion information, second conversion information and third conversion information corresponding to the search term feature, the keyword feature and the value feature respectively.

Step S4012: Perform splicing processing on the first conversion information, the second conversion information and the third conversion information to obtain combined conversion information.

After the speech signal is obtained, the first conversion information, the second conversion information and the third conversion information can be determined based on the speech signal. The first conversion information is used for performing conversion processing on the speech signal to obtain the search term feature. The second conversion information is used for performing conversion processing on the speech signal to obtain the keyword features. The third conversion information is used for performing conversion processing on the speech signal to obtain the value feature. In specific applications, after a speech signal is obtained, a preset speech recognition algorithm or a speech recognition model can be used to process the speech signal, so as to obtain a search term feature, a keyword feature, and a value feature corresponding to the speech signal. The speech recognition algorithm or the speech recognition model includes first conversion information, second conversion information and third conversion information corresponding to the search term feature, the keyword feature and the value feature respectively.

After the first conversion information, the second conversion information, and the third conversion information are obtained, the first conversion information, the second conversion information, and the third conversion information can be spliced, so that combined conversion information can be obtained. The combined conversion information includes the above three pieces of conversion information. For example, the speech signal is I, the search term feature is Q, the keyword feature is K, and the value feature is V. The first conversion information is a conversion matrix $W^Q$, the second conversion information is a conversion matrix $W^K$, and the third conversion information is a conversion matrix $W^V$. Relationships between the above conversion matrices and the speech signal is: $Q=W^Q*I$, $K=W^K*I$, $V=W^V*I$. After the above conversion relationship is obtained, the conversion matrix $W^Q$, the conversion matrix $W^K$, and the conversion matrix $W^V$ can be spliced, so that combined conversion information $W^O$ can be obtained, and the combined conversion information is also matrix information.

Step S402: Use a self-attention mechanism to process the search term feature, the keyword feature and the value feature to determine a number of attention mechanisms corresponding to the speech signal.

In different application scenarios, the number of attention mechanisms can be different. For example, in relatively simple application scenarios, the number of attention mechanisms can be relatively low. In more complex application scenarios, the number of attention mechanisms can be high. In general, after the search feature, the keyword feature, and the value feature are obtained, these features can be processed using a self-attention mechanism, so that the number of attention mechanisms corresponding to the speech signal can be determined. Specifically, using the self-attention mechanism to process the search term features, the keyword feature, and value feature, and determining the number of attention mechanisms corresponding to the speech signal may include:

Step S4021: Use the following formula to obtain the number of attention mechanisms corresponding to the speech signal:

$$head_i = Attention(QW_i^Q, KW_i^K, VW_i^V)$$

wherein $head_i$ is the $i^{th}$ attention mechanism, Attention is the self-attention mechanism, Q is the search term feature, K is the keyword feature, V is the value feature, and $W_i^Q$ is the first conversion information corresponding to the $i^{th}$ search term feature, $W_i^K$ is the second conversion information corresponding to the $i^{th}$ keyword feature, and $W_i^V$ is the third conversion information corresponding to the $i^{th}$ value feature.

In this step, the above formula can quickly and effectively determine the number of attention mechanisms corresponding to the speech signal, thereby facilitating the rapid and accurate analysis and processing of the speech signal based on the number of attention mechanisms.

Step S403: Obtain first feature information corresponding to the speech signal according to the number of attention mechanisms and the combined conversion information.

Figure 6:
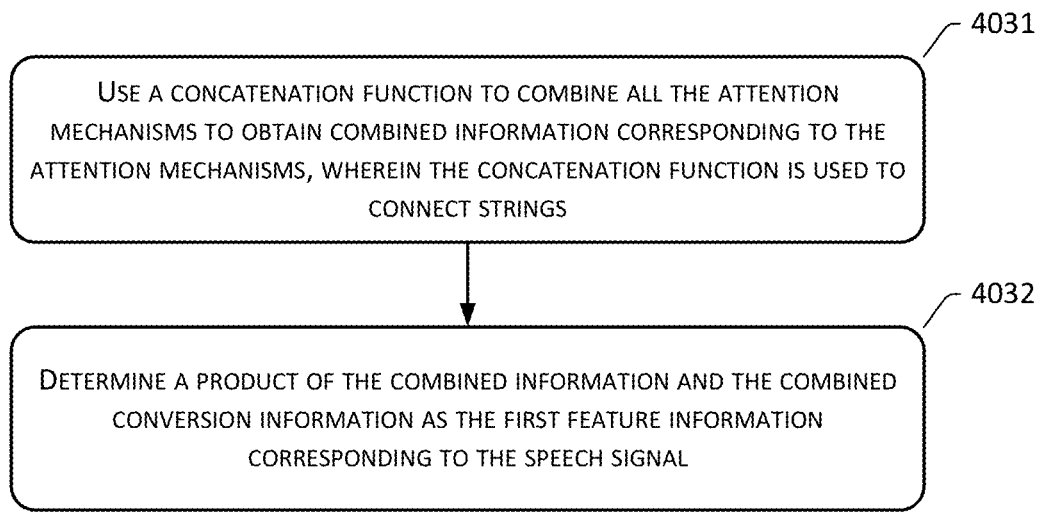
FIG. 6 is a schematic flowchart of obtaining first feature information corresponding to a speech signal according to the number of attention mechanisms and combined conversion information provided by the present disclosure.

After the number of attention mechanisms and the combined conversion information are obtained, the number of attention mechanisms and the combined conversion information may be analyzed and processed to determine first feature information corresponding to the speech signal. Specifically, referring to FIG. 6, according to the number of attention mechanisms and the combined conversion information, obtaining the first feature information corresponding to the speech includes:

Step S4031: Use a concatenation function to combine all the attention mechanisms to obtain combined information corresponding to the attention mechanisms, wherein the concatenation function is used to connect strings.

Step S4032: Determine a product of the combined information and the combined conversion information as the first feature information corresponding to the speech signal.

A concatenation function concat is used to combine texts from multiple regions and/or strings. After obtaining the number of attention mechanisms, a concatenation function is used to combine and concatenate all the attention mechanisms to obtain combined information corresponding to the attention mechanisms. A specific formula is as follows: $H=concat(head_1, \ldots, head_h)$, wherein H is the combined information corresponding to the attention mechanism, concat( ) is the concatenation function, $head_1$ is the first attention mechanism, and $head_h$ is the $h^{th}$ attention mechanism.

After the combined information is obtained, a product of the combined information and the combined conversion information can be determined as the first feature information, that is, $MutliHead(Q,K,V)=c_t=concat(head_1, \ldots, head_h)W^O$, wherein $c_t$ is the first feature information, and $W^O$ is the combined conversion information, so that the first feature information corresponding to the speech signal can be obtained accurately and effectively.

In implementations, the number of attention mechanisms corresponding to the speech signal is determined by obtaining combined conversion information corresponding to the search term feature, the keyword feature, and the value feature, and the first feature information corresponding to the speech signal is then obtained based on the number of attention mechanisms and the combined conversion information, thus effectively ensuring the accuracy and reliability of obtaining the first feature information, and further improving the quality and efficiency of identifying the speech signal.

Figure 7:
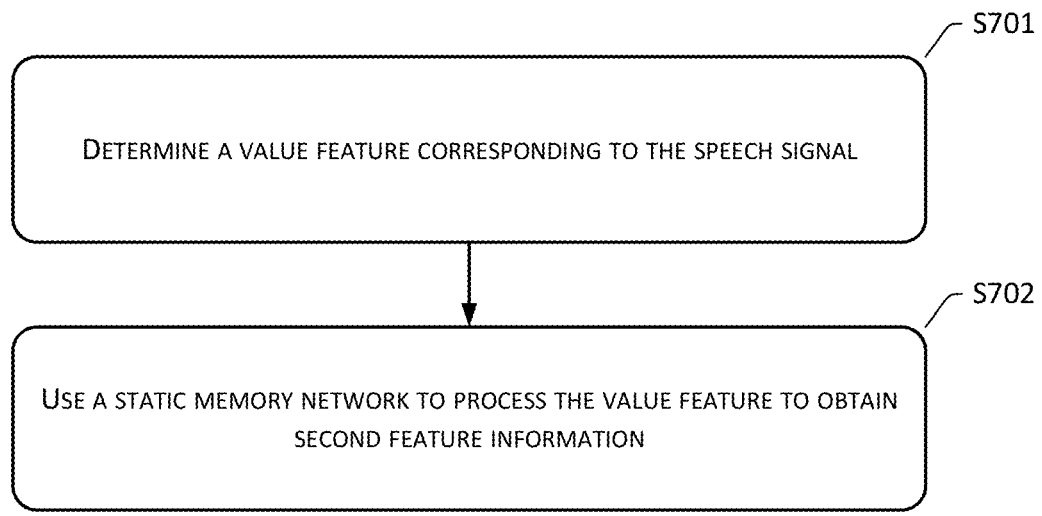
FIG. 7 is a schematic flowchart of processing a speech signal using a second neural network to obtain second feature information corresponding to the speech signal according to the present disclosure.

FIG. 7 is a schematic flowchart of using a second neural network to process a speech signal to obtain second feature information corresponding to the speech signal according to the present disclosure. On the basis of the above embodiments and with continued reference what is shown in FIG. 7, in this embodiment, using a second neural network to process the speech signal to obtain second feature information corresponding to the speech signal includes:

Step S701: Determine a value feature corresponding to the speech signal.

Step S702: Use a static memory network to process the value feature to obtain second feature information.

After the speech signal is obtained, conversion processing can be performed on the speech signal, so that a value feature (V) corresponding to the speech signal can be obtained. Specifically, conversion information corresponding to the speech signal (the third conversion information $W^V$) is first determined, and the conversion information is used for performing conversion processing on the speech signal, so that the value feature can be obtained.

Figure 8:
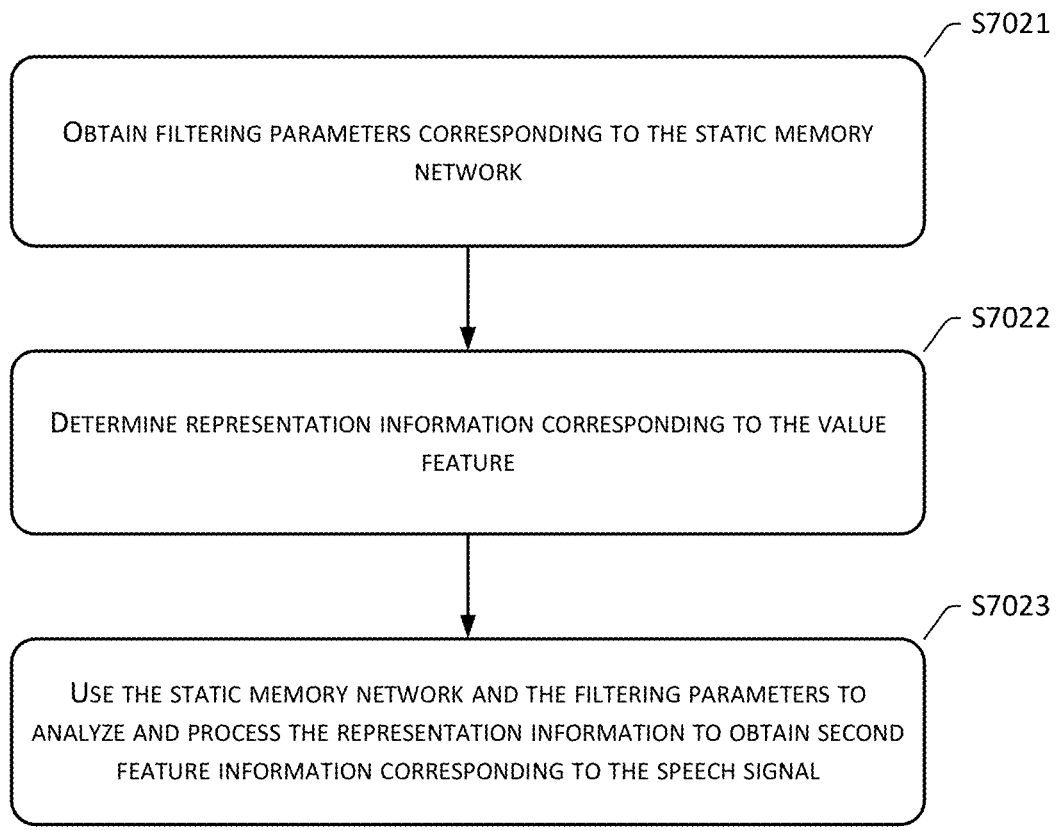
FIG. 8 is a schematic flowchart of processing a value feature using a static memory network to obtain second feature information according to the present disclosure.

After the value feature is obtained, the value feature can be processed by a static memory network to obtain second feature information. In implementations, referring to FIG. 8, using the static memory network to process the value feature to obtain the second feature information may include:

Step S7021: Obtain filtering parameters corresponding to the static memory network.

Step S7022: Determine representation information corresponding to the value feature.

Step S7023: Use the static memory network and the filtering parameters to analyze and process the representation information to obtain second feature information corresponding to the speech signal.

For the static memory network, a set of initial filtering parameters can be pre-configured, and data processing is realized by using these initial filtering parameters. In order to improve the quality and efficiency of data processing by the static memory network, the corresponding filtering parameters can be learnable or trainable. In other words, with the continuous learning and optimization of data by the static memory network, the filtering parameters can be changed.

In addition, after the value feature is determined, the value feature can be analyzed and processed to determine representation information corresponding to the feature. After the filtering parameters and the representation information are obtained, analysis and processing can be performed on the representation information using the static memory network and the filtering parameters, to obtain second feature information corresponding to the speech signal. In implementations, using the static memory network and the filtering parameters to analyze and process the representation information to obtain the second feature information corresponding to the speech signal includes:

Step S70231: Use the following formula to obtain the second feature information corresponding to the speech signal:

$$m_t = h_t + \sum_{i=0}^{N_1} \alpha_t \odot h_{t-s_{1*i}} + \sum_{j=1}^{N_2} b_t \odot h_{t-s_{2*j}}$$

wherein $m_t$ is second feature information, $h_t$ is representation information of a value feature at time t, $\alpha_t$ and $b_t$ are filtering parameters that can be learned respectively, $\odot$ is a dot product, $h_{t-s_{1*i}}$ is representation information of the value feature at time $-s_{1*i}$, $h_{t-s_{2*j}}$ is representation information of the value feature at time $t-s_{2*j}$, $s_{1*i}$ and $s_{2*j}$ are preset stride factors, respectively, and i and j are accumulated index parameters.

In implementations, by determining the value feature corresponding to the speech signal, and then using the static memory network to process the value feature to obtain the second feature information, this not only effectively ensures the accuracy and reliability of obtaining the second feature information, but also effectively improves the accuracy of obtaining target feature information by analyzing the second feature information and the first feature information that is obtained, because the method of obtaining the second feature information is different from the method of obtaining the first feature information, thus further improving the quality and efficiency of speech signal recognition.

On the basis of any one of the above embodiments, after determining the target feature information used to represent the semantics in the speech signal, the method in this embodiment may further include:

Step S901: Send the target feature information to a decoder, to allow the decoder to analyze and process the target feature information to obtain text information corresponding to the speech signal.

The speech processing apparatus may be a speech encoder. Such speech encoder may encode and process an obtained speech signal, and thereby obtain target feature information for identifying semantics in the speech signal. In order to realize analysis and recognition of the semantic signal, after the speech encoder can sends the target feature information to a decoder after obtaining the target feature information. As such, the decoder can analyze and process the target feature information after obtaining the target feature information, and thereby obtain text information corresponding to the speech signal, so that a machine can recognize the text information corresponding to the speech signal.

Figure 9:
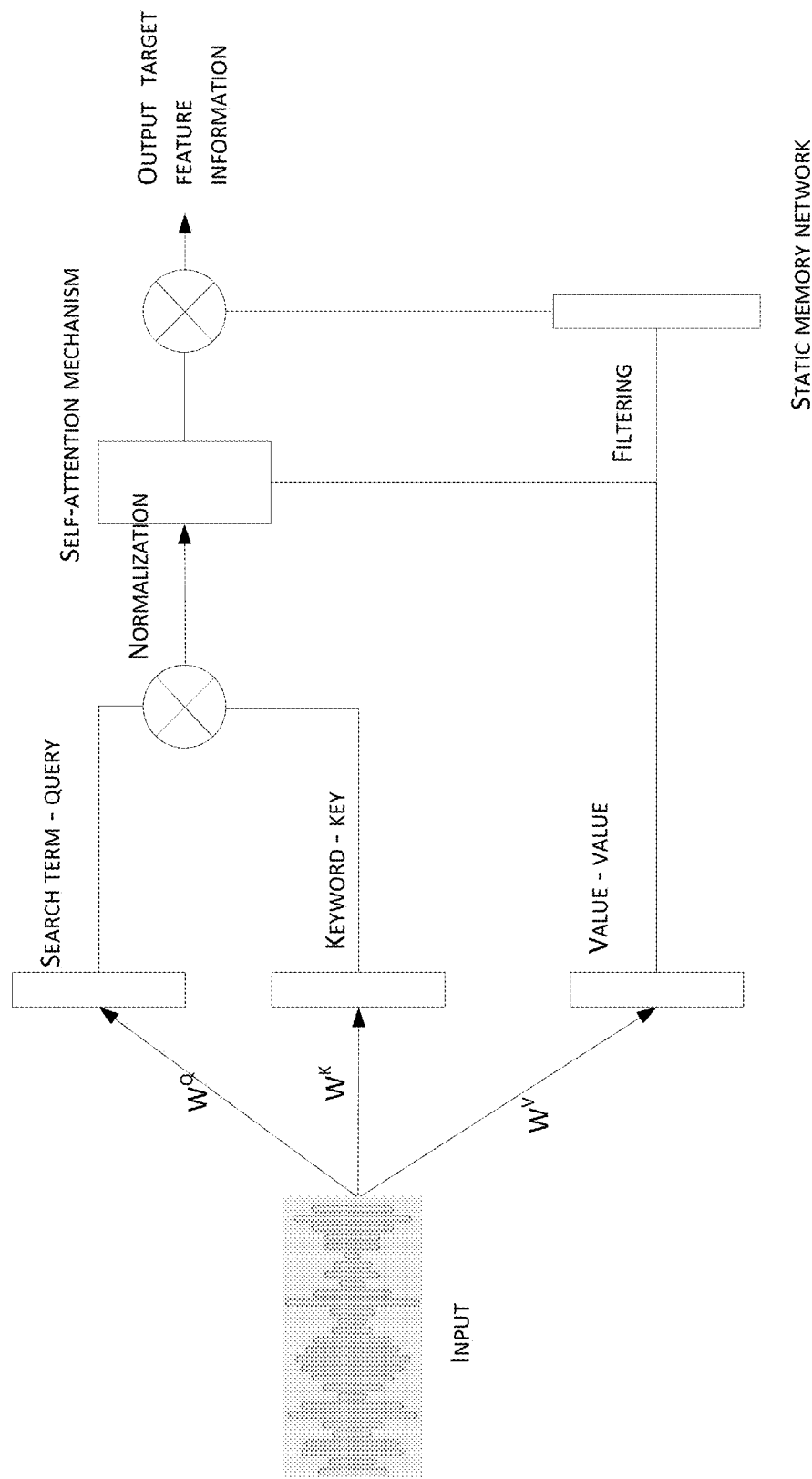
FIG. 9 is a schematic diagram of a speech processing method provided by the present disclosure.

In specific applications, referring to FIG. 9, this application embodiment provides a speech processing method. An executive body of the speech processing method may be a speech encoder. Such speech encoder is based on a dynamic and static memory network (Dynamic and Static Memory Network, abbreviated as DSMN). The dynamic and static memory network combines a dynamic self-attention mechanism and a static memory network, so that DSMN has stronger speech recognition ability than the existing Transformer model and DFSMN model. As such, a speech encoder or speech processing system constructed based on the DSMN model can obtain a better recognition performance.

In implementations, the speech processing method may include the following steps:

Step 1: Obtain a speech signal inputted by a user.

In implementations, after speech information is inputted by a user, processing (for example, framing processing, filtering processing, noise reduction processing, etc.) can be performed on the speech information, so as to obtain a speech signal inputted by the user. The speech signal can be a speech acoustic feature sequence. It can be understood that the speech acoustic feature sequence includes a feature sequence for representing semantic information and a feature sequence for identifying user features.

Step 2: Determine a speech feature corresponding to the speech signal.

In implementations, first conversion information $W^Q$, second conversion information $W^K$, and third conversion information $W^V$ is obtained first. The speech signal I is then converted using the first conversion information to obtain a search term feature Q that is, $Q=W^Q*I$ corresponding to the speech signal. The speech signal I is converted using the second conversion information to obtain a keyword feature K, that is, $K=W^K*I$ corresponding to the speech signal. The speech signal I is converted using the third conversion information to obtain a value feature V, that is, $K=W^V*I$, corresponding to the speech signal.

Step 3: Use a self-attention mechanism to analyze and process a search term feature, a keyword feature and a value feature to obtain first feature information for identifying semantics in the speech signal.

In implementations, a normalization function is first used to normalize the search term feature and the keyword feature, and a self-attention mechanism is then used to process the normalized data and the value feature according to the following formula, so as to obtain a first attention message.

$$\text{Attention}(Q, K, V) = \text{softmax}\left(\frac{QK^T}{\sqrt{d_k}}\right)V$$

wherein Attention is a self-attention mechanism, Q is a search term feature, K is a keyword feature, V is a value feature, softmax is a normalized number of rows, $K^T$ is transposition information of the keyword feature, and $d_k$ is a preset dimension parameter.

Step 4: Use the self-attention mechanism to process the search term feature, the keyword feature and the value feature to determine a number of attention mechanisms corresponding to the speech signal.

The number of attention mechanisms corresponding to the speech signal is obtained using the following formula:

$$\text{head}_i = \text{Attention}(QW_i^Q, KW_i^K, VW_i^V);$$

wherein $\text{head}_i$ is the $i^{th}$ attention mechanism, Attention is the self-attention mechanism, Q is the search term feature, K is the keyword feature, V is the value feature, and $W_i^Q$ is the first conversion information corresponding to the $i^{th}$ search term feature, $W_i^K$ is the second conversion information corresponding to the $i^{th}$ keyword feature, and $W_i^V$ is the third conversion information corresponding to the $i^{th}$ value feature.

Step 5: Determine the first feature information corresponding to the speech signal according to the number of attention mechanisms.

In implementations, combined conversion information $W^O$ corresponding to the search term feature, the keyword feature, and the value feature is obtained. The combined conversion information $W^O$ includes the conversion information $W^O$ corresponding to the search term feature, the conversion information $W^K$ corresponding to the keyword feature, and the conversion information $W^V$ corresponding to the value feature. Then, based on the number of attention mechanisms and the combined conversion information, the first feature information corresponding to the speech signal is obtained according to the following formula:

$$c_t = \text{concat}(\text{head}_1, \ldots, \text{head}_h)W^O$$

Among them, $c_t$ is the first feature information, concat( ) is the concatenation function, $\text{head}_1$ is the first attention mechanism, $\text{head}_h$ is the $h^{th}$ attention mechanism, and $W^O$ is the combined conversion information.

Step 6: Use a static memory network and filtering parameters to analyze and process the value feature to obtain second feature information corresponding to the speech signal.

In implementations, representation information corresponding to the value feature is obtained, and the representation information is processed by the static memory network according to the following formula to obtain the second feature information:

$$m_t = h_t + \sum_{i=0}^{N_1} \alpha_t \odot h_{t-s_{1*i}} + \sum_{j=1}^{N_2} b_t \odot h_{t-s_{2*j}}$$

wherein $m_t$ is the second feature information, $h_t$ is the representation information of the value feature at time t, $\alpha_t$ and $b_t$ are the learnable filtering parameters respectively, $\odot$ is the dot product, $h_{t-s_{1*i}}$ is the representation information of the value feature at time $t-s_{1*i}$, $h_{t-s_{2*j}}$ is the representation information of the value feature at time $t-s_{2*j}$, $s_{1*i}$ and $s_{2*j}$ are the preset stride factors respectively, and i and j are the accumulated index parameters.

Step 7: Determine a sum of the first feature information and the second feature information as target feature information, and output the target feature information to a speech decoder.

The target feature information is used to identify the semantic information included in the speech signal. Specifically, the target feature information is a sum of the first feature information and the second feature information, that is, $y_t = c_t + m_t$. $y_t$ is the target feature information, the first feature information is $c_t$, and the second feature information is $m_t$. After obtaining the target feature information, the target feature information can be outputted to a speech decoder, so that the speech decoder can perform a speech recognition operation based on the target feature information.

In the speech processing method provided by this application embodiment, an input speech signal is processed through a dynamic and static memory network, and target feature information for identifying semantics in the speech signal is obtained, so that processing, such as speech recognition processing, speech synthesis processing, etc., can be performed on the speech signal based on the target feature information that is obtained. Since the target feature information is obtained through two kinds of neural networks with complementary performance, the quality of target feature information acquisition is effectively guaranteed, thereby effectively improving the quality and efficiency of processing the speech signal and further improving the stability and reliability of the method.

Figure 10:
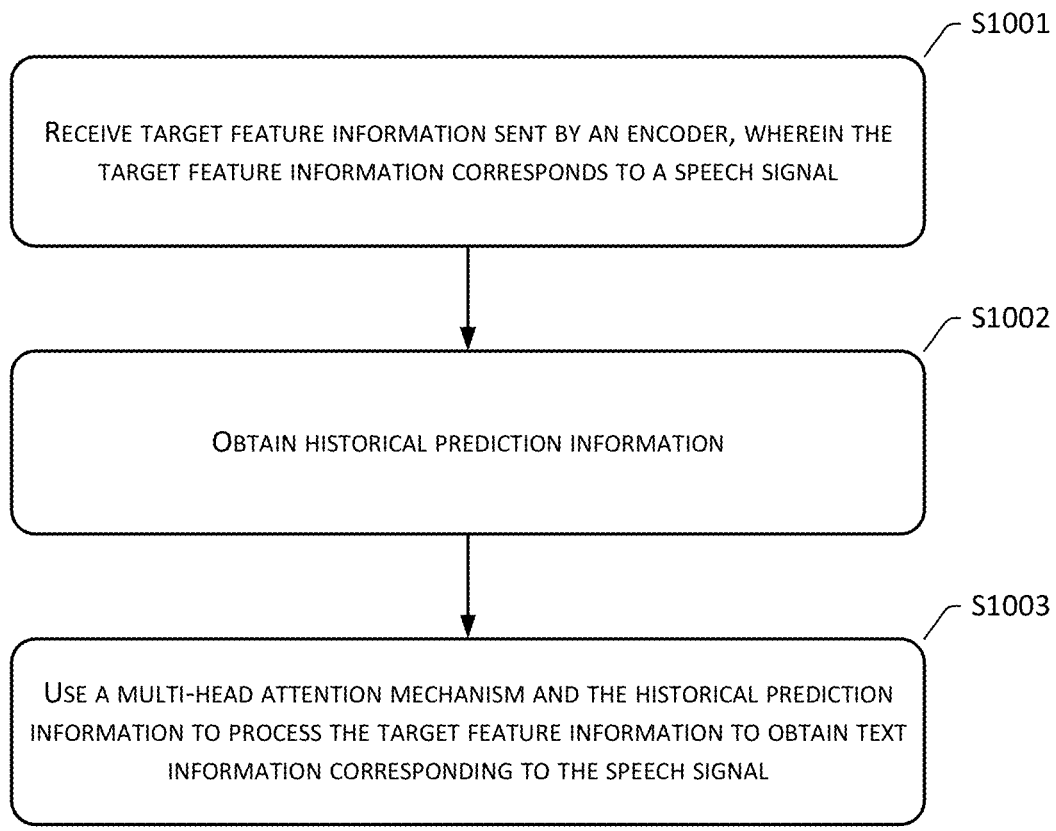
FIG. 10 is a schematic flowchart of another speech processing method provided by the present disclosure.
Figure 11:
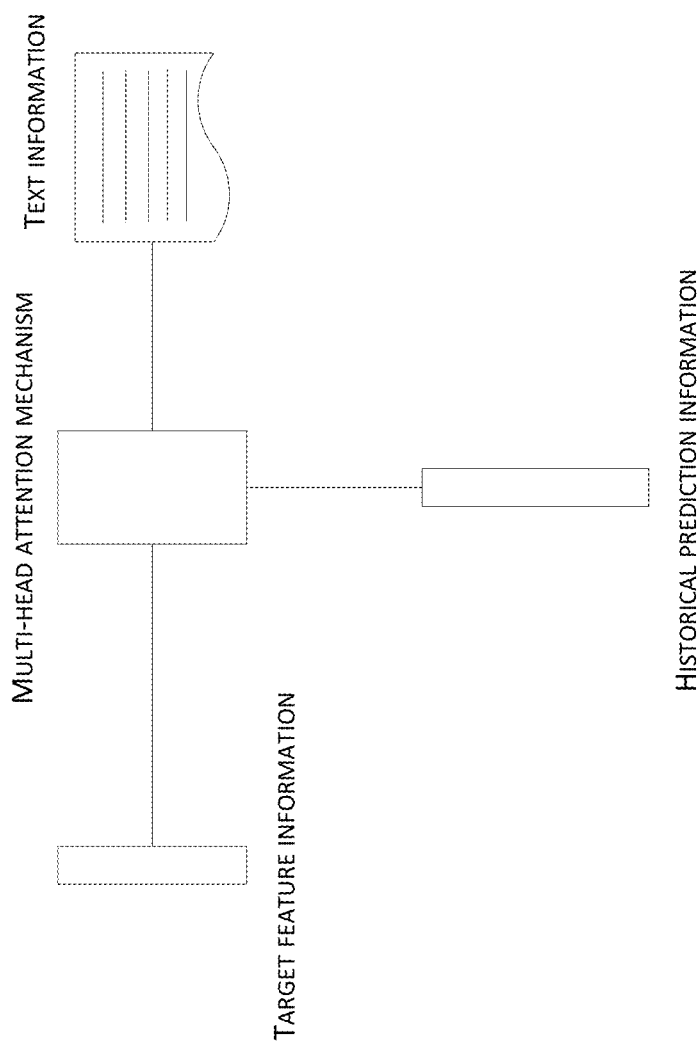
FIG. 11 is a schematic diagram of another speech processing method provided by the present disclosure.

FIG. 10 is a schematic flowchart of another speech processing method provided by the present disclosure. FIG. 11 is a schematic diagram of another speech processing method provided by the present disclosure. A speech processing method is provided, and an executive body of the method can be a speech processing apparatus. It can be understood that the speech processing apparatus can be implemented as software, or a combination of software and hardware. In specific applications, the speech processing apparatus may be a speech decoder, and the speech decoder may be connected in communication with a speech encoder to receive speech feature signals sent by the speech encoder, process the speech feature signals, and obtain text information corresponding to the feature signals. Specifically, the speech processing method may include:

Step S1001: Receive target feature information sent by an encoder, wherein the target feature information corresponds to a speech signal.

Step S1002: Obtain historical prediction information.

Step S1003: Use a multi-head attention mechanism and the historical prediction information to process the target feature information to obtain text information corresponding to the speech signal.

The historical prediction information may be speech recognition result(s) obtained by the speech encoder performing speech recognition operations at historical moment(s). It can be understood that the historical prediction information may be blank information at the initial moment. After the speech encoder sends the target feature information to the speech decoder, the speech decoder can obtain the target feature information sent by the speech encoder, wherein the target feature information is used to identify semantic information in the speech signal. After obtaining the target feature information, the speech decoder can obtain historical prediction information, which can be stored in a preset area, and then use a multi-head attention mechanism and the historical prediction information to process the target feature information to obtain text information corresponding to the speech signal.

For example, the semantics corresponding to a current speech signal is "you are beautiful". After obtaining target feature information corresponding to this speech signal "you", historical prediction information can be obtained. If the historical prediction information can include: the probability that information outputted after the speech signal "you" is "you" is P1, the probability that information outputted after the speech signal "you" is "good" is P2, and the probability that information outputted after the speech signal "you" is "in" is P3, the probability that information outputted after the speech signal "you" is "yes" is P4, etc. The historical prediction information at this time includes information corresponding to the following semantics: "you", "hello", "you are", "you in".

After obtaining the historical prediction information, the multi-head attention mechanism and the historical prediction information are used to analyze and identify the target feature information, and at least one piece of semantic text information corresponding to the speech signal and probability information corresponding to each piece of semantic text information can then be accurately obtained. It can be understood that when the number of the at least one piece of semantic text information is one, the semantic text information can be directly determined as final semantic text information. When the number of the at least one piece of semantic text information is multiple, the probability information corresponding to each piece of semantic text information can be obtained, and a piece of semantic text information with the largest probability information can be determined as the final text information corresponding to the speech signal. This can effectively improve the accuracy and reliability of recognition of the speech signal.

Figure 12:
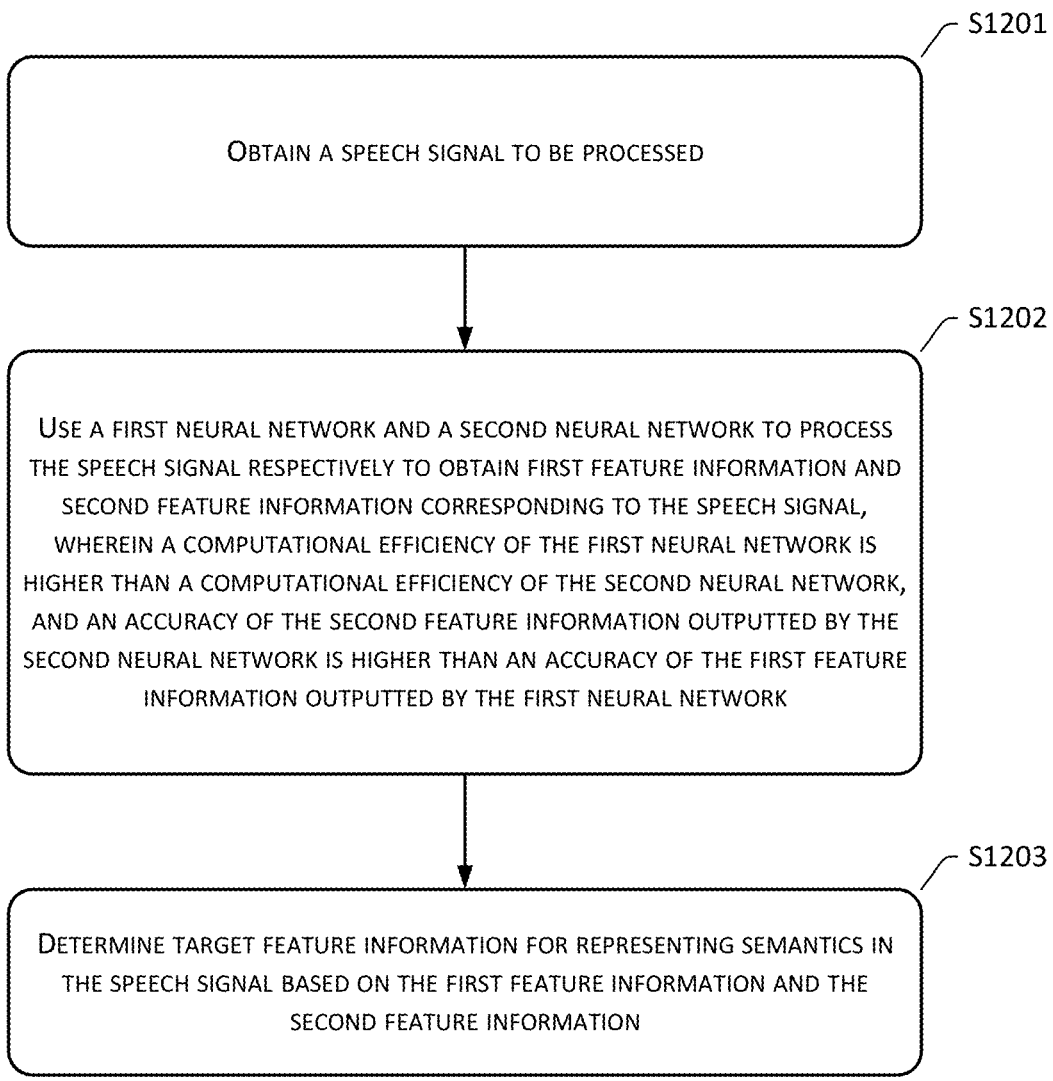
FIG. 12 is a schematic diagram of yet another speech processing method provided by the present disclosure.

FIG. 12 is a schematic diagram of another speech processing method provided by the present disclosure. With reference to FIG. 12, this embodiment provides another speech processing method, and an execution body of the method may be a speech processing apparatus. It can be understood that the speech processing apparatus can be implemented as software, or a combination of software and hardware. In specific applications, the speech processing apparatus may be a speech encoder, and the speech encoder can process speech signals to obtain feature information used to represent semantics in the speech signals. Specifically, the speech processing method may include:

Step S1201: Obtain a speech signal to be processed.

Step S1202: Use a first neural network and a second neural network to process the speech signal respectively to obtain first feature information and second feature information corresponding to the speech signal, wherein a computational efficiency of the first neural network is higher than a computational efficiency of the second neural network, and an accuracy of the second feature information outputted by the second neural network is higher than an accuracy of the first feature information outputted by the first neural network.

Step S1203: Determine target feature information for representing semantics in the speech signal based on the first feature information and the second feature information.

The first neural network may include any one of the following: a self-attention mechanism, a static memory network (Static Memory Network, SMN for short). The second neural network may include any one of the following: a self-attention mechanism and a static memory network. It should be noted that the computational efficiency of the first neural network is higher than the computational efficiency of the second neural network, and the accuracy of the second feature information outputted by the second neural network is higher than the accuracy of the first feature information outputted by the first neural network. The first neural network and the second neural network have their own advantages, that is, the first neural network has advantages in terms of computational efficiency, and the second neural network has advantages in terms of accuracy of outputting feature information.

It can be understood that the first neural network is not limited to the types of networks exemplified above, and one skilled in the art can also set the first neural network to other types of neural networks according to specific application requirements and design requirements. The first neural network may process speech signals to obtain feature information for identifying semantics in the speech signals, which will not be repeated herein.

Similarly, the second neural network is not limited to the types of networks exemplified above, and one skilled in the art can also set the second neural network to other types of neural networks according to specific application requirements and design requirements, as long as the first neural network and the second neural network can be guaranteed to be different, and the second neural network can be made to process speech signals to obtain feature information for identifying semantics in the speech signals, which will not be repeated herein.

It should be noted that the first neural network and the second neural network may not be limited to the implementation manners defined in the above embodiments. For example, the computational efficiency of the second neural network is higher than the computational efficiency of the first neural network, and the accuracy of the first feature information outputted by the first neural network is higher than the accuracy of the second feature information outputted by the second neural network. Alternatively, in specific applications, different neural networks can be selected according to different application scenarios for implementation. For example, in application scenarios that need to ensure the computational efficiency, the first neural network can be selected to process speech information. In application scenarios that need to ensure the accuracy of feature information, the second neural network can be selected to process speech information. Alternatively, in specific applications, different combinations of the first neural network and the second neural network can also be selected according to different application scenarios, thereby achieving can users' selections of different neural network combinations according to different application scenarios to determine target feature information used to characterize semantics in speech signals, further improving the flexibility and reliability of the method.

Similarly, since the speech signal includes a first signal for identifying speech semantics and a second signal for identifying user features, in order to improve the quality and the efficiency of processing the speech signal, after obtaining the speech signal, the speech signal can be processed using the second neural network, so that second feature information corresponding to the speech signal can be obtained, and the second feature information can be used to identify the semantics included in the speech signal. Since the second neural network is different from the first neural network, the second feature information obtained through the second neural network and the first feature information obtained through the first neural network is complementary to each other in terms of quality and efficiency of speech recognition.

After the first feature information and the second feature information is obtained, the first feature information and the second feature information may be analyzed and processed to determine target feature information used to represent semantics in the speech signal. Since the first neural network and the second neural network are different, the efficiency and quality of processing the speech signal using the first neural network and the second neural network are complementary to each other. After obtaining the first feature information and the second feature information, a sum of the first feature information and the second feature information that is complementary is determined as the target feature information. Since the target feature information at this time is a combination of the first feature information and the second feature information, this thereby effectively improves the quality and efficiency of recognizing the speech signal.

In the speech processing method provided in this embodiment, an obtained speech signal is processed by a first neural network to obtain first feature information, and a second neural network is used to process the obtained speech signal to obtain second feature information. Since the first neural network and the second neural network are different, the first feature information and the second feature information that is obtained is complementary to each other in terms of efficiency and quality of speech processing. Based on the first feature information and the second feature information, target feature information used to characterize the semantics of the speech signal is then determined, thus effectively ensuring the quality of acquisition of the target feature information, and further improving the quality and efficiency of processing the speech signal and ensuring the practicability of the method.

In some instances, using the first neural network to process the speech signal to obtain the first feature information corresponding to the speech signal may include: determining speech feature information corresponding to the speech signal, wherein the speech feature information includes at least one of the following: a search feature, a keyword feature, and a value feature; and processing the speech feature information based on a self-attention mechanism to obtain the first feature information.

In some instances, when the speech feature information includes: a search term feature, a keyword feature, and a value feature, processing the speech feature information based on the self-attention mechanism to obtain the first feature information may include: obtaining and combined conversion information corresponding to the search term feature, the keyword feature, and the value feature, the combined conversion information including conversion information corresponding to the search term feature, conversion information corresponding to the keyword feature, and conversion information corresponding to the value feature; using the self-attention mechanism to process the search term feature, the keyword feature, and the value feature to determine a number of attention mechanisms corresponding to the speech signal; and obtaining the first feature information corresponding to the speech signal based on the number of attention mechanisms and combined conversion information.

In some instances, obtaining the first feature information corresponding to the speech signal based on the number of attention mechanisms and the combined conversion information may include: using a concatenation function to combine all the number of attention mechanisms and obtain combined information corresponding to the attention mechanisms, wherein the concatenation function is used to connect strings; setting a product of the combined information and the combined conversion information as the first feature information corresponding to the speech signal.

In some instances, obtaining the combined conversion information corresponding to the search term feature, the keyword feature, and the value feature may include: obtaining first conversion information, second conversion information, and third conversion information corresponding to the search term feature, the keyword feature, and the value feature respectively; and performing splicing processing on the first conversion information, the second conversion information, and the third conversion information to obtain the combined conversion information.

In some instances, using the second neural network to process the speech signal to obtain the second feature information corresponding to the speech signal may include: determining a value feature corresponding to the speech signal; and using a static memory network to process the value feature to obtain the second feature information.

In some instances, using the static memory network to process the value feature to obtain the second feature information may include: obtaining filtering parameters corresponding to the static memory network; determining representation information corresponding to the value feature; using the static memory network and the filtering parameters to analyze and process the representation information to obtain the second feature information corresponding to the speech signal.

In some instances, determining the target feature information for characterizing semantics in the speech signal based on the first feature information and the second feature information may include:

determining a sum of the first feature information and the second feature information as the target feature information.

In some instances, after determining the target feature information for representing the semantics in the speech signal, the method in this embodiment may further include: sending the target feature information to a decoder, to allow the decoder to analyze and process the target feature information and obtain text information corresponding to the speech signal.

The processes of execution, methods of implementation, and the technical effects of the method in this embodiment are similar to the processes of execution, methods of implementation, and the technical effects of the method in the embodiments as shown in FIG. 1 to FIG. 11. Portions of this embodiment that are not described in detail can be referenced to relevant descriptions of the embodiments as shown in FIG. 1 to FIG. 9, and are not repeated herein.

Figure 13:
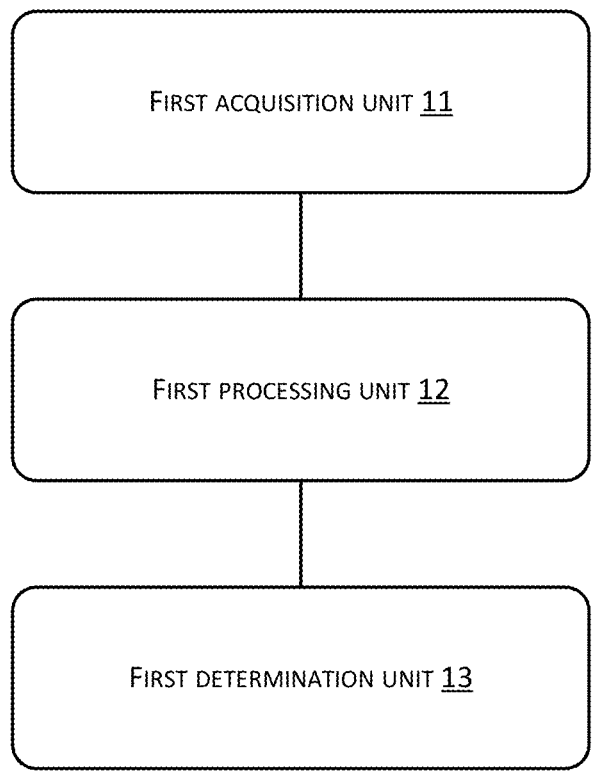
FIG. 13 is a schematic structural diagram of a speech encoder according to the present disclosure.

FIG. 13 is a schematic structural diagram of a speech encoder according to the present disclosure. With reference to FIG. 13, this embodiment provides a speech encoder, which can perform the speech processing method shown in FIG. 1 above. The speech encoder may include: a first acquisition unit 11, a first processing unit 12 and a first determination unit 13, wherein:

the first acquisition unit 11 is configured to obtain a speech signal to be processed;

the first processing unit 12 is configured to process the speech signal using a first neural network to obtain first feature information corresponding to the speech signal, the first feature information being used to identify semantics in the speech signal;

the first processing unit 12 is further configured to process the speech signal using a second neural network to obtain second feature information corresponding to the speech signal, the second feature information being used to identify the semantics in the speech signal, and the second feature information being different from the first feature information; and the first determination unit 13 is configured to determine target feature information used to represent the semantics in the speech signal based on the first feature information and the second feature information.

In some instances, the first neural network includes a self-attention mechanism, and the second neural network includes a static memory network.

In some instances, when the first processing unit 12 processes the speech signal using the first neural network to obtain the first feature information corresponding to the speech signal, the first processing unit 12 may be configured to perform: determining speech feature information corresponding to the speech signal, the speech feature information including at least one of the following: a search term feature, a keyword feature, and a value feature; and obtaining the first feature information by processing the speech feature information based on a self-attention mechanism.

In some instances, when the speech feature information includes: the search term feature, the keyword feature, and the value feature, and when the first processing unit 12 processes the speech feature information based on the self-attention mechanism to obtain the first feature information, the processing unit 12 may be configured to perform: obtaining combined conversion information corresponding to the search term feature, the keyword feature, and the value feature, wherein the combined conversion information includes conversion information corresponding to the search term feature, conversion information corresponding to the keyword feature, conversion information corresponding to the value feature; using the self-attention mechanism to process the search term feature, the keyword feature, and the value feature to determine a number of attention mechanisms corresponding to the speech signal; and obtaining the first feature information corresponding to the speech signal based on the number of attention mechanisms and the combined conversion information.

In some instances, when the first processing unit 12 obtains the first feature information corresponding to the speech signal based on the number of attention mechanisms and the combined conversion information, the first processing unit 12 may be configured to perform: using a concatenation function to combine all the number of attention mechanisms to obtain combined information corresponding to the attention mechanisms, wherein the concatenation function is used to connect strings; and determining a product of the combined information and the combined conversion information as the first feature information corresponding to the speech signal.

In some instances, when the first processing unit 12 obtains the combined conversion information corresponding to the search term feature, the keyword feature and the value feature, the first processing unit 12 may be configured to perform: respectively obtaining first conversion information, second conversion information, and third conversion information corresponding to the search term feature, the key feature and the value feature; and slicing the first conversion information, the second conversion information and the third conversion information to obtain the combined conversion information.

In some instances, when the first processing unit 12 uses the self-attention mechanism to process the search term feature, the keyword feature, and the value feature to determine the number of attention mechanisms corresponding to the speech signal, the first processing unit 12 can be configured to perform: obtaining the number of attention mechanisms corresponding to the speech signal using the following formula:

$$head_i = \text{Attention}(QW_i^Q, KW_i^K, VW_i^V)$$

wherein $head_i$ is the $i^{th}$ attention mechanism, Attention is the self-attention mechanism, Q is the search term feature, K is the keyword feature, V is the value feature, and $W_i^Q$ is the first conversion information corresponding to $i^{th}$ the search term feature, $W_i^K$ is the second conversion information corresponding to the $i^{th}$ keyword feature, and $W_i^V$ is the third conversion information corresponding to the $i^{th}$ value feature.

In some instances, when the first processing unit 12 processes the speech signal using the second neural network to obtain the second feature information corresponding to the speech signal, the first processing unit 12 may be configured to perform: determining a value feature corresponding to the speech signal; and using a static memory network to process the value feature to obtain the second feature information.

In some instances, when the first processing unit 12 uses the static memory network to process the value feature to obtain the second feature information, the first processing unit 12 may be configured to perform: obtaining filtering parameters corresponding to the static memory network; determining representation information corresponding to the value feature; using the static memory network and the filtering parameters to analyze and process the representation information to obtain the second feature information corresponding to the speech signal.

In some instances, when the first processing unit 12 uses the static memory network and the filtering parameters to analyze and process the representation information to obtain the second feature information corresponding to the speech signal, the first processing unit 12 may be configured to perform: obtaining the second feature information corresponding to the speech signal using the following formula:

$$m_t = h_t + \sum_{i=0}^{N_1} \alpha_t \odot h_{t-s_1*i} + \sum_{j=1}^{N_2} b_t \odot h_{t-s_2*j}$$

wherein $m_t$ is the second feature information, $h_t$ is the representation information of the value feature at time t, $\alpha_t$ and $b_t$ are the learnable filtering parameters respectively, $\odot$ is the dot product, $h_{t-s_1*i}$ is the representation information of the value feature at time $t-h_{t-s_2*j}$ is the representation information of the value feature at time $t-s_{2*j}$, $s_{1*i}$ and $s_{2*j}$ are the preset stride factors respectively, and i and j are the accumulated index parameters.

In some instances, when the first determination unit 13 determines the target feature information used to represent the semantics in the speech signal based on the first feature information and the second feature information, the first determination unit 13 may be configured to perform: determining a sum of the feature information and the second feature information as the target feature information.

In some instances, after determining the target feature information used to represent the semantics in the speech signal, the first processing unit 12 in this embodiment may also be configured to perform: sending the target feature information to a decoder, to allow the decoder to analyze and process target feature information to obtain text information corresponding to the speech signal.

The apparatus shown in FIG. 13 may execute the methods of the embodiments shown in FIG. 1 to FIG. 9. For parts not described in detail in this embodiment, reference may be made to relevant descriptions of the embodiments shown in FIG. 1 to FIG. 9. For execution processes and technical effects of this technical solution, reference may be made to the descriptions in the embodiments shown in FIG. 1 to FIG. 9, which will not be repeated herein.

Figure 14:
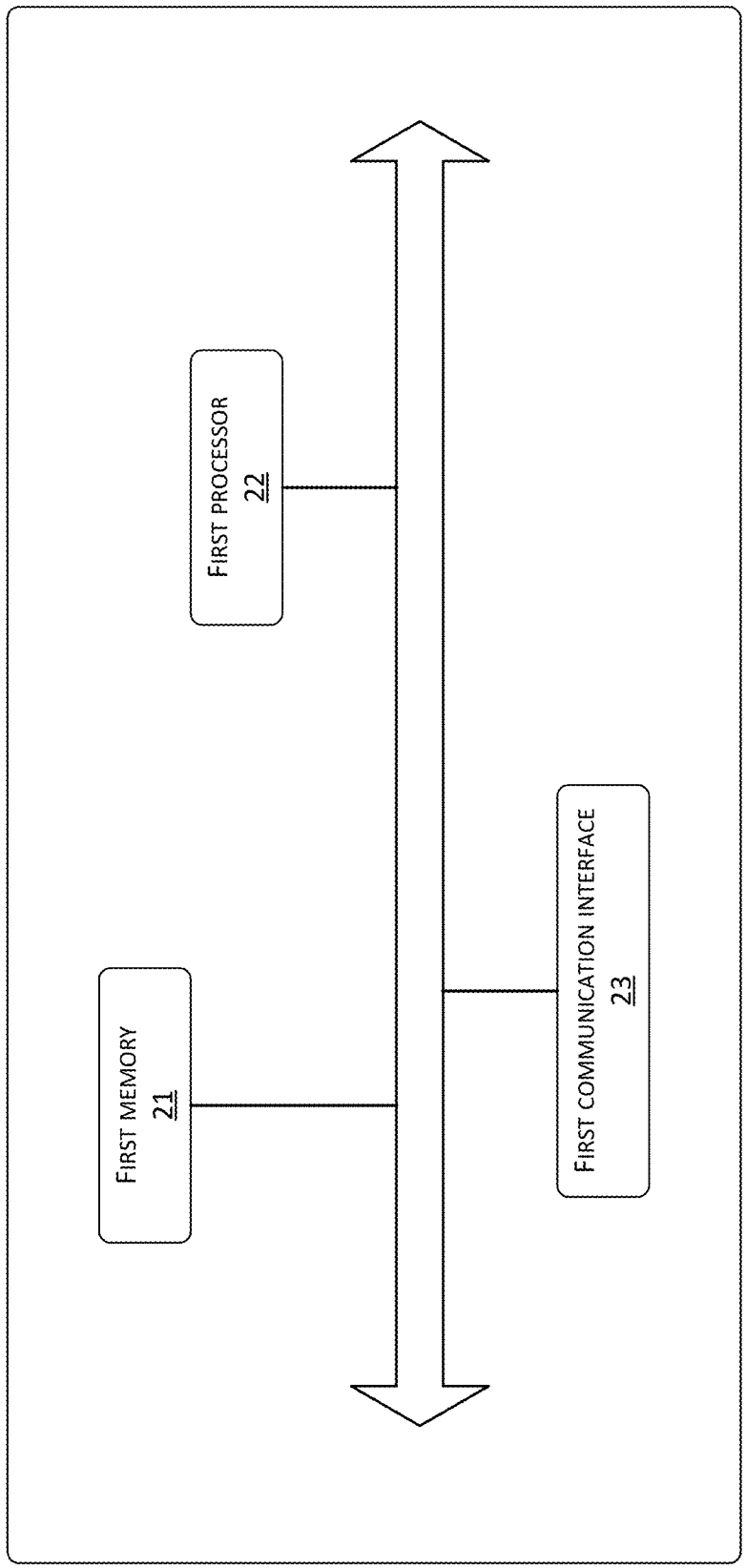
FIG. 14 is a schematic structural diagram of an electronic device corresponding to the speech encoder as shown in FIG. 13.

In a possible design, the structure of the speech encoder shown in FIG. 13 can be implemented as an electronic device. The electronic device can be various devices such as a variety of devices, such as mobile phone, a tablet computer, and a server, etc. As shown in FIG. 14, the electronic device may include: a first processor 21 and a first memory 22. The first memory 22 is used to store programs of the speech processing methods provided in the embodiments shown in FIG. 1 to FIG. 9 and executed by the corresponding electronic device, and the first processor 21 is configured to execute the programs stored in the first memory 22.

The program includes one or more computer instructions, wherein, when the one or more computer instructions are executed by the first processor 21, the following steps can be implemented:
  obtaining a speech signal to be processed;
  using a first neural network to process the speech signal to obtain first feature information corresponding to the speech signal, wherein the first feature information is used to identify semantics in the speech signal;
  using a second neural network to process the speech signal to obtain second feature information corresponding to the speech signal, wherein the second feature information is used to identify the semantics in the speech signal, and the second feature information is different from the first feature information;
  determining target feature information for representing the semantics in the speech signal based on the first feature information and the second feature information.

Further, the first processor 21 is further configured to execute all or part of the steps in the foregoing embodiments shown in FIG. 1 to FIG. 9.

The structure of the electronic device may further include a first communication interface 23 for the electronic device to communicate with other devices or a communication network.

In addition, an embodiment of the present disclosure provides a computer storage medium for storing computer software instructions used by an electronic device, which includes programs for executing the speech processing methods in the method embodiments shown in FIG. 1 to FIG. 9.

Figure 15:
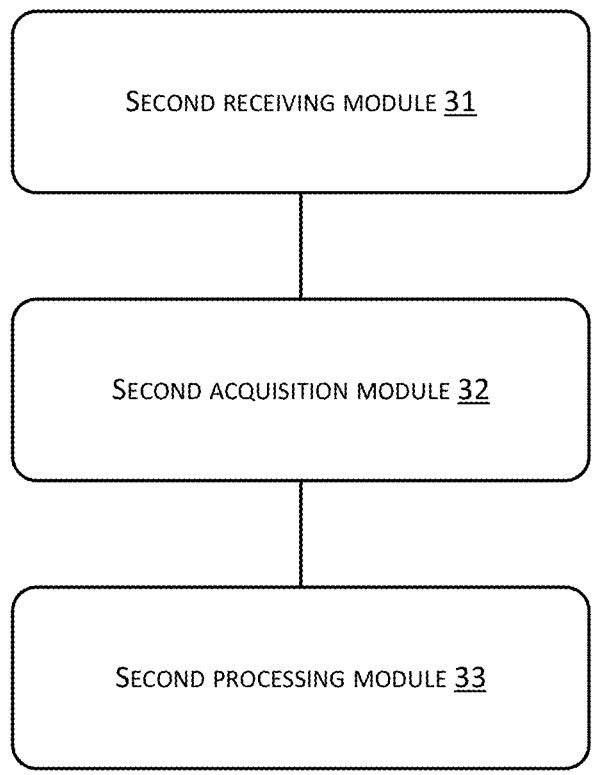
FIG. 15 is a schematic structural diagram of a speech decoder according to the present disclosure.

FIG. 15 is a schematic structural diagram of a speech decoder provided by the present disclosure. With reference to FIG. 15, this embodiment provides a speech decoder that can perform the speech processing method shown in FIG. 10 above. The speech decoder may include: a second receiving module 31, a second acquisition module 32 and a second processing module 33, wherein:
  the second receiving module 31 is configured to receive target feature information sent by the encoder, the target feature information corresponding to a speech signal;
  the second acquisition module 32 is configured to obtain historical prediction information; and
  the second processing module 33 is configured to process the target feature information using a multi-head attention mechanism and the historical prediction information to obtain text information corresponding to the speech signal.

The apparatus shown in FIG. 15 may execute the methods of the embodiments shown in FIG. 10 and FIG. 11. For parts not described in detail in this embodiment, reference may be made to relevant descriptions of the embodiments shown in FIG. 10 and FIG. 11. For the execution processes and technical effects of the technical solution, reference may be made to the descriptions in the embodiments shown in FIG. 10 to FIG. 11, which will not be repeated herein.

Figure 16:
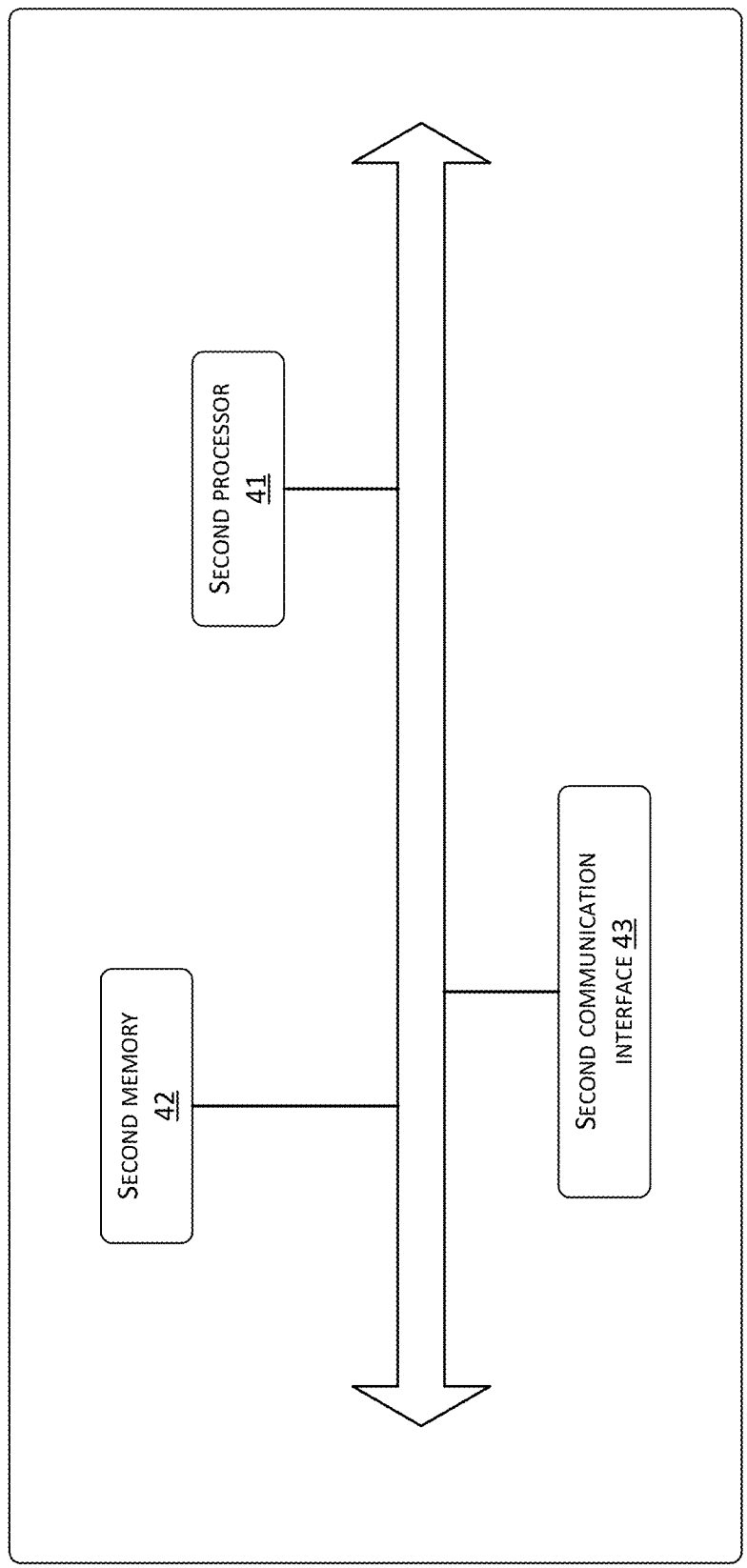
FIG. 16 is a schematic structural diagram of an electronic device corresponding to the speech decoder as shown in FIG. 15.

In a possible design, the structure of the speech decoder shown in FIG. 15 can be implemented as an electronic device, and the electronic device can be a variety of devices, such as a mobile phone, a tablet computer, and a server, etc. As shown in FIG. 16, the electronic device may include: a second processor 41 and a second memory 42. The second memory 42 is used to store programs of the speech processing methods provided in the embodiments shown in FIG. 10 and FIG. 11 and executed by the corresponding electronic device, and the second processor 41 is configured to execute the programs stored in the second memory 42.

The program includes one or more computer instructions, wherein, when the one or more computer instructions are executed by the first processor 41, the following steps can be implemented:
  receiving target feature information sent by an encoder, the target feature information corresponding to a speech signal;
  obtaining historical forecast information; and
  using a multi-head attention mechanism and the historical prediction information to process the target feature information to obtain text information corresponding to the speech signal.

Further, the second processor 41 is further configured to execute all or part of the steps in the foregoing embodiments shown in FIG. 10 and FIG. 11.

The structure of the electronic device may further include a second communication interface 43 for the electronic device to communicate with other devices or a communication network.

In addition, an embodiment of the present disclosure provides a computer storage medium for storing computer software instructions used by an electronic device, which includes programs for executing the speech processing methods in the method embodiments shown in FIGS. 10 and 11.

Figure 17:
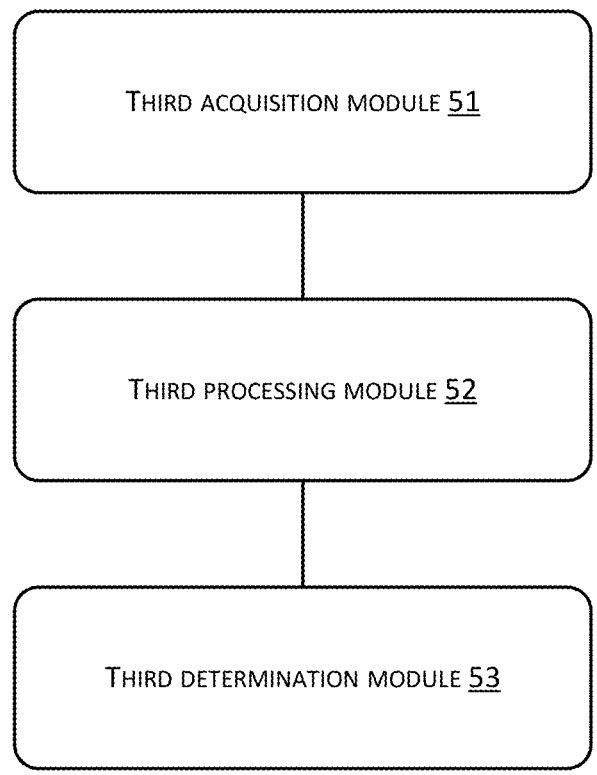
FIG. 17 is a schematic structural diagram of another speech encoder provided by the present disclosure.

FIG. 17 is a schematic structural diagram of another speech encoder provided by an embodiment of the present disclosure. With reference to FIG. 17, this embodiment provides another speech encoder, which can perform the above-mentioned speech processing method shown in FIG. 12. The speech encoder may include: a third acquisition unit 51, a third processing unit 52, and a third determination unit 53. Specifically,
  the third acquisition module 51 is configured to obtain a speech signal to be processed;
  the third processing module 52 configured to process the speech signal using a first neural network and a second neural network to obtain first feature information and second feature information corresponding to the speech signal respectively, wherein a computational efficiency of the first neural network is higher than a computational efficiency of the second neural network, and an accuracy of the second feature information outputted by the second neural network is higher than an accuracy of the first feature information outputted by the first neural network; and the third determination module 53 configured to determine target feature information used to represent semantics in the speech signal based on the first feature information and the second feature information.

In some instances, the first neural network includes a self-attention mechanism, and the second neural network includes a static memory network.

In some instances, when the third processing module 52 processes the speech signal using the first neural network to obtain the first feature information corresponding to the speech signal, the third processing module 52 may be configured to perform: determining speech feature information corresponding to the signal, the speech feature information including at least one of the following: a search term feature, a keyword feature, and a value feature; and processing the speech feature information based on a self-attention mechanism to obtain the first feature information.

In some instances, when the speech feature information includes: the search term feature, the keyword feature, and the value feature, and when the third processing module 52 processes the speech feature information based on the self-attention mechanism to obtain the first feature information, the third processing module 52 can be configured to perform: obtaining combined conversion information corresponding to the search term feature, the keyword feature, and the value feature, wherein the combined conversion information includes conversion information corresponding to the search term feature, and conversion information corresponding to the keyword feature, and conversion information corresponding to the value feature; using the self-attention mechanism to process the search term feature, the keyword feature, and the value feature to determine a number of attention mechanisms corresponding to the speech signal; and obtaining the first feature information corresponding to the speech signal based on the number of attention mechanisms and the combined conversion information.

In some instances, when the third processing module 52 obtains the first feature information corresponding to the speech signal based on the number of attention mechanisms and the combined conversion information, the third processing module 52 may be configured to perform: using a concatenation function to combine all the number of attention mechanisms to obtain combined information corresponding to the attention mechanisms, wherein the concatenation function is used to connect strings; determining a product of the combined information and the combined conversion information as the first feature information corresponding to the speech signal.

In some instances, when the third processing module 52 obtains the combined conversion information corresponding to the search term feature, the keyword feature, and the value feature, the third processing module 52 may be configured to perform: obtaining first conversion information, second conversion information, and the third conversion information corresponding to the search term feature, the key feature, and the value feature respectively; and splicing the first conversion information, the second conversion information, and the third conversion information to obtain the combined conversion information.

In some instances, when the third processing module 52 uses the second neural network to process the speech signal to obtain the second feature information corresponding to the speech signal, the third processing module 52 may be configured to perform: determining a value feature corresponding to the speech signal; and using a static memory network to process the value feature to obtain the second feature information.

In some instances, when the third processing module 52 uses the static memory network to process the value feature to obtain the second feature information, the third processing module 52 can be used to perform: obtaining filtering parameters corresponding to the static memory network; determining representation information corresponding to the value feature; and using the static memory network and the filtering parameters to analyze and process the representation information to obtain the second feature information corresponding to the speech signal.

In some instances, when the third determination module 53 determines the target feature information used to represent the semantics in the speech signal based on the first feature information and the second feature information, the third determination module 53 may be configured to perform: setting a sum of the feature information and the second feature information as the target feature information.

In some instances, after determining the target feature information used to represent the semantics in the speech signal, the third processing module 52 in this embodiment may also be configured to perform: sending the target feature information to a decoder, to allow the decoder to analyze and process the target feature information to obtain text information corresponding to the speech signal.

The apparatus shown in FIG. 17 may execute the method of the embodiment shown in FIG. 12. For the parts not described in detail in this embodiment, reference may be made to the related description of the embodiment shown in FIG. 12. For the execution processes and technical effects of the technical solution, reference may be made to the description in the embodiment shown in FIG. 12, which will not be repeated herein.

Figure 18:
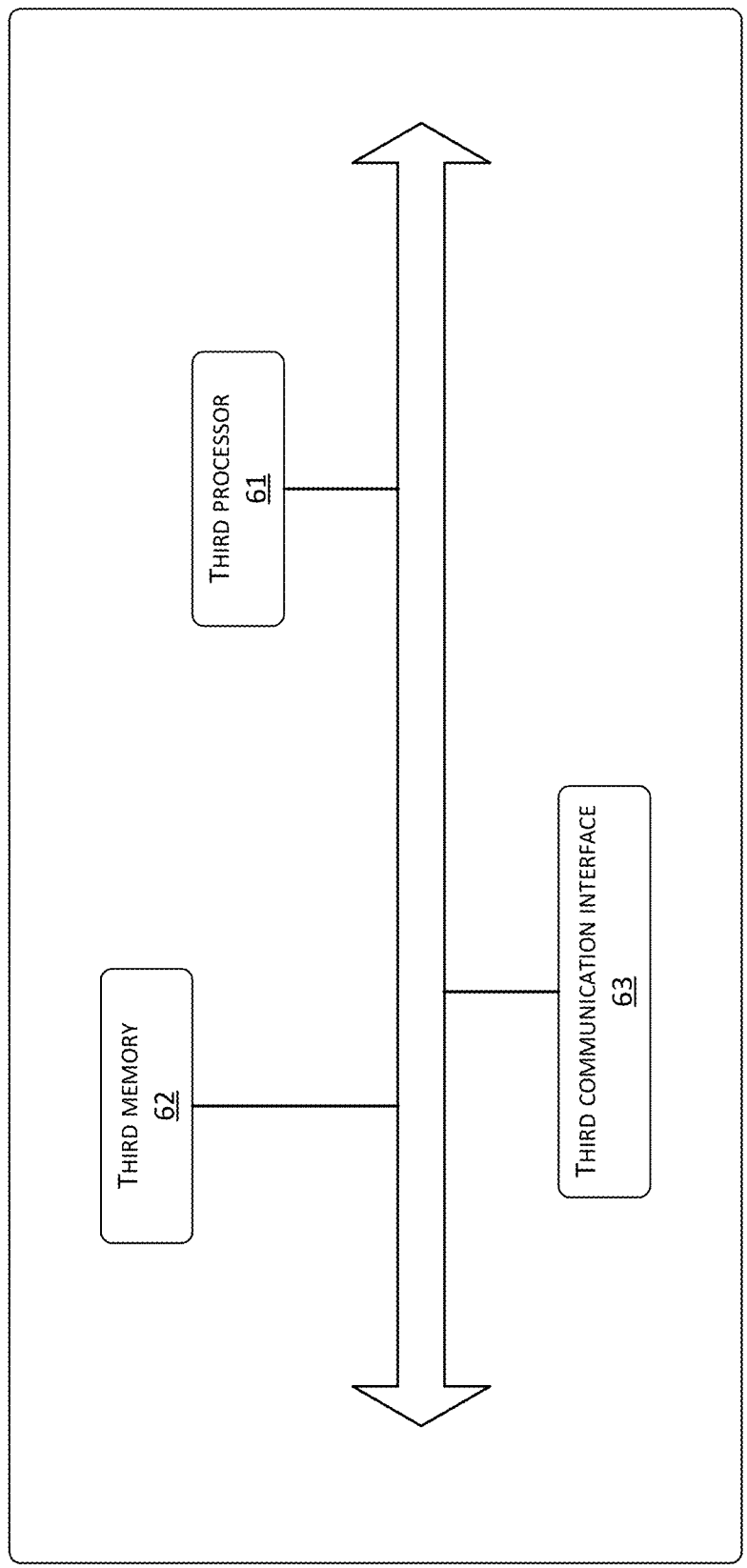
FIG. 18 is a schematic structural diagram of an electronic device corresponding to the speech encoder as shown in FIG. 17.

In a possible design, the structure of the speech encoder shown in FIG. 17 can be implemented as an electronic device. The electronic device can be a variety of devices, such as a mobile phone, a tablet computer, and a server, etc. As shown in FIG. 18, the electronic device may include: a third processor 61 and a third memory 62. The third memory 62 is used to store a program of the speech processing method provided in the embodiments shown in FIG. 12 and executed by the corresponding electronic device, and the third processor 61 is configured to execute the program stored in the third memory 62.

The program includes one or more computer instructions, wherein, when the one or more computer instructions are executed by the third processor 61, the following steps can be implemented:

obtaining a speech signal to be processed;

using a first neural network and a second neural network process the speech signal to obtain first feature information and second feature information corresponding to the speech signal respectively, wherein a computational efficiency of the first neural network is higher than a computational efficiency of the second neural network, and an accuracy of the second feature information outputted by the second neural network is higher than an accuracy of the first feature information outputted by the first neural network;

determining target feature information for representing semantics in the speech signal based on the first feature information and the second feature information.

Further, the third processor 61 is further configured to execute all or part of the steps in the foregoing embodiment shown in FIG. 12.

The structure of the electronic device may further include a third communication interface 63 for the electronic device to communicate with other devices or a communication network.

In addition, an embodiment of the present disclosure provides a computer storage medium for storing computer software instructions used by an electronic device, which includes a program for executing the speech processing method in the method embodiment shown in FIG. 12 above.

Figure 19:
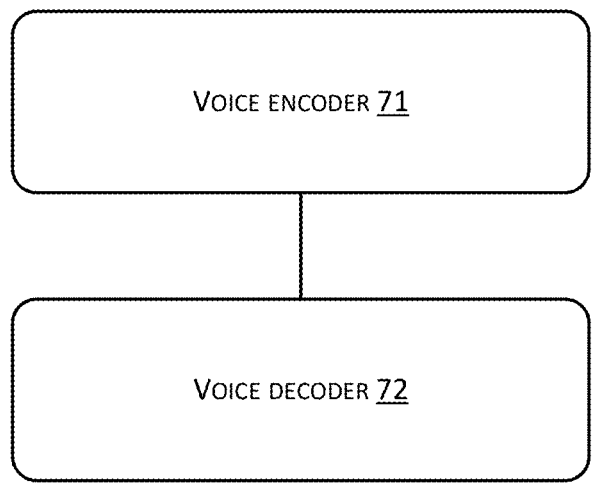
FIG. 19 is a schematic structural diagram of a speech recognition system according to the present disclosure.
Figure 20:
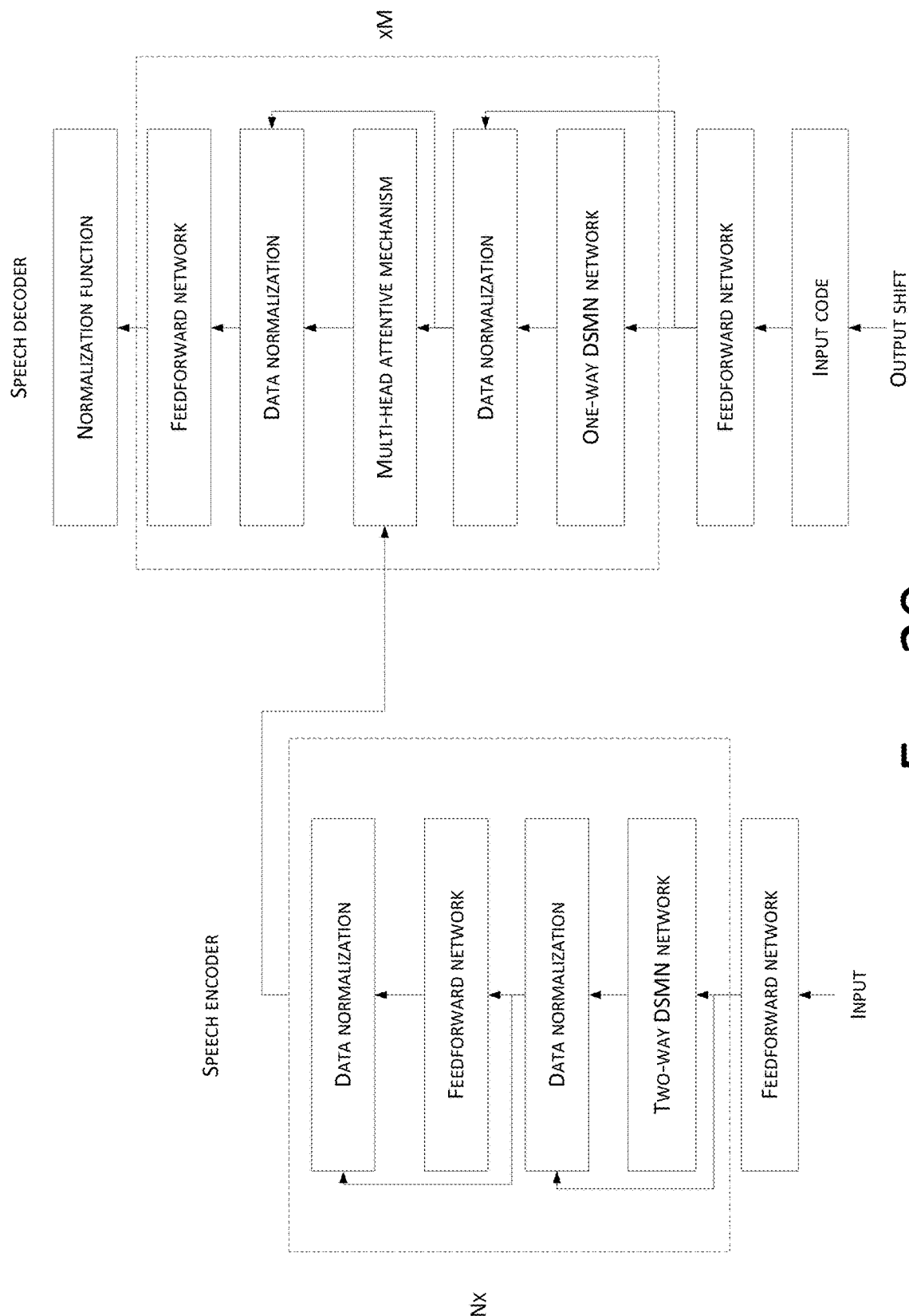
FIG. 20 is a schematic diagram of an application of a speech recognition system provided by the present disclosure.

FIG. 19 is a schematic structural diagram of a speech recognition system provided by an embodiment of the present disclosure. FIG. 20 is a schematic diagram of a speech recognition system provided by an application embodiment of the present disclosure. Referring to FIGS. 19 and 20, this embodiment provides a speech recognition system. Such speech recognition system can realize recognition and processing of speech signals input by users, so as to obtain text information corresponding to the semantic signals. Specifically, the speech recognition system can include:

the speech encoder 71 as shown in FIG. 13 or FIG. 17 above, the speech encoder 71 being configured to perform data dimensionality reduction processing on an obtained speech signal to obtain speech feature information corresponding to the speech signal, the speech feature information being used to identify semantic information in the speech signal.

In some instances, the system may also include:

the speech decoder 72 configured to receive the speech feature information sent by the speech encoder 71, and output text information corresponding to the speech signal based on the speech feature information.

In some instances, when the speech decoder 72 outputs the text information corresponding to the speech signal based on the speech feature information, the speech decoder 72 may be configured to perform: obtaining historical prediction information; and using a multi-head attention mechanism and the historical prediction information to process the speech feature information to obtain the text information corresponding to the speech signal.

In implementations, with reference to FIGS. 19 and 20, performing speech recognition by the speech recognition system may include the following process:

The speech encoder 71 obtains a speech signal S inputted by a user, uses a preset feedforward network to filter out redundant signals included in the speech signal to obtain a speech signal S1, and then uses a two-way DSMN network to process the speech signal S1, thereby obtaining feature information S2 for identifying semantic information in the speech signal S, wherein the two-way DSMN network can process the speech signal S1 in combination with data of historical time(s) and the future time(s), and thereby obtain the feature information S2.

After the feature information S2 is obtained, data normalization processing can be performed on the feature information S2. A feedforward network can then be used to process the feature information S2, so that the redundant signals included in the feature signal S2 can be removed, and a feature signal S3 can be obtained, Data normalization processing is then performed on the feature signal S3, so that a target feature signal S4 corresponding to the speech signal S can be obtained, and the target feature signal S4 can be sent to the speech decoder 52.

The speech decoder 72 obtains the target feature signal S4 sent by the speech encoder 71; obtains historical prediction information M; encodes the historical prediction information M to obtain historical prediction information M1; uses a feedforward network to filter out redundant signal included in the historical prediction information M1 to obtain historical prediction information M2; uses an one-way DSMN network to process the historical prediction information M2 to obtain historical prediction information M3 corresponding to the historical prediction information M2, wherein the one-way DSMN network can process the historical prediction information M2 in combination with data of historical moment(s), so that the historical prediction information M3 can be obtained; performs the data normalization processing on the historical prediction information M3, so that historical prediction information M4 corresponding to the historical prediction information M can be obtained; and sends the historical prediction information M4 sent to a multi-head attention mechanism network.

After the multi-head attention mechanism network obtains the historical prediction information M4 and the target feature signal S4, the target feature signal S4 can be analyzed and processed in combination with the historical prediction information M4, so that text information W corresponding to the target feature signal S4 can be obtained.

After the text information W is obtained, in order to improve the quality and the efficiency of speech recognition, data normalization processing can be performed on the obtained text information W to obtain text information W1, and a feedforward network is then used to filter out redundant signals included in the text information W1. A normalization function is then used to process the filtered text information, so that target text information W2 corresponding to the speech signal S can be obtained.

In the speech recognition system provided in this embodiment, a speech signal to be recognized is obtained through the speech encoder 71, and target feature information corresponding to the speech signal is determined. The target feature information is then sent to the speech decoder 72, wherein the speech decoder 72 performs speech recognition operation on the target feature information using a multi-head attention mechanism after the target feature information is obtained, so that text information corresponding to the speech signal can be obtained. This not only effectively realizes speech recognition operations, but also improves the accuracy of speech recognition, the quality and the efficiency of speech signal processing, and further improves the stability and reliability of the speech recognition system.

The apparatus embodiments described above are only illustrative. Units that are described as separate components may or may not be physically separated. Components displayed as units may or may not be physical units, that is, may be located in one place, or may be distributed over multiple network elements. Some or all of the modules may be selected according to actual needs to achieve the purpose of the solutions in the embodiments of the present disclosure. One of ordinary skill in the art can understand and implement them without making any creative effort.

Through the above description of the embodiments, one skilled in the art will clearly understand that each embodiment can be implemented by adding a necessary general hardware platform, and apparently can also be implemented by a combination of hardware and software. With this understanding in mind, the essence of the above technical solutions or the portions that contribute to the existing technologies may be embodied in a form of a computer product. The present disclosure may adopt a form of a computer program product implemented on one or more computer-usable storage media (which includes, but are not limited to, disk storage, CD-ROM, optical storage, and the like) having computer-usable program codes embodied therein.

The present disclosure is described with reference to flowcharts and/or block diagrams of methods, apparatus (systems), and computer program products according to the embodiments of the present disclosure. It will be understood that each process and/or block of the flowcharts and/or block diagrams, and combinations of processes and/or blocks in the flowcharts and/or block diagrams, can be implemented by computer program instructions. These computer program instructions may be provided to a general purpose computer, a special purpose computer, an embedded processor, or a processor of other programmable device to produce a machine, to cause the instructions to generate an apparatus for implementing the functions specified in one or more processes of the flowcharts and/or one or more blocks of the block diagrams through the computer or the processor of other programmable device.

These computer program instructions may also be stored in a computer-readable storage device that can direct a computer or other programmable device to function in a particular manner, such that the instructions stored in the computer-readable storage device produce an article of manufacture including an instruction apparatus which implements the functions specified in one or more processes of the flowcharts and/or one or more blocks of the block diagrams.

These computer program instructions may also be loaded onto a computer or other programmable device to cause a series of operational steps to be performed on the computer or other programmable device so as to produce a computer implemented process, such that the instructions executed on the computer or other programmable device provide steps for implementing the functions specified in one or more processes of the flowcharts and/or one or more blocks of the block diagrams.

In a typical configuration, a computing device or electronic device includes one or more processors (CPUs), input/output interface(s), network interface(s), and memory.

The memory (such as the first memory 22, the second memory 42, and the third memory 62 as described in the foregoing embodiments and shown in FIGS. 14, 16, and 18) may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Finally, it needs to be noted that: the above embodiments are only intended to illustrate the technical solutions of the present disclosure, but not to impose limitations thereon. Although the present disclosure has been described in detail with reference to the foregoing embodiments, one of ordinary skill in the art should understand that: the technical solutions described in the foregoing embodiments may be modified, or some technical features may be equivalently replaced. Such modifications or replacements do not depart from the spirit and scope of the corresponding technical solutions of the embodiments of the present disclosure.

The present disclosure can be further understood using the following clauses.

Clause 1: A data processing method, comprising: obtaining a speech signal to be processed; using a first neural network to process the speech signal to obtain first feature information corresponding to the speech signal, wherein the first feature information is used to identify semantics in the speech signal; using a second neural network to process the speech signal to obtain second feature information corresponding to the speech signal, wherein the second feature information is used to identify the semantics in the speech signal, wherein the second feature information is different from the first feature information; and determining target feature information used to represent the semantics in the speech signal based on the first feature information and the second feature information.

Clause 2: The method according to Clause 1, wherein: the first neural network includes a self-attention mechanism, and the second neural network includes a static memory network.

Clause 3: The method according to Clause 2, wherein using the first neural network to process the speech signal to obtain the first feature information corresponding to the speech signal comprises: determining speech feature information corresponding to the speech signal, wherein the speech feature information includes at least one of: a search term feature, a keyword feature, and a value feature; and processing the speech feature information based on a self-attention mechanism to obtain the first feature information.

Clause 4: The method according to Clause 3, wherein, when the speech feature information includes: the search term feature, the keyword feature, and the value feature, processing the speech feature information based on the self-attention mechanism to obtain the first feature information, comprises: obtaining combined conversion information corresponding to the search term feature, the keyword feature, and the value feature, wherein the combined conversion information includes conversion information corresponding to the search term feature, conversion information corresponding to the keyword feature, and conversion information corresponding to the value feature; using the self-attention mechanism to process the search term feature, the keyword feature, and the value feature, and determining a number of attention mechanisms corresponding to the speech signal; and obtaining the first feature information corresponding to the speech signal based on the number of the attention mechanisms and the combined conversion information.

Clause 5: The method according to Clause 4, wherein obtaining the first feature information corresponding to the speech signal based on the number of the attention mechanisms and the combined conversion information, comprises: using a concatenation function to combine all the attention mechanisms to obtain combined information corresponding to the attention mechanisms, wherein the concatenation function is used to connect strings; and determining a product of the combined information and the combined conversion information as the first feature information corresponding to the speech signal.

Clause 6: The method according to Clause 4, wherein obtaining the combined conversion information corresponding to the search term feature, the keyword feature and the value feature comprises: obtaining first conversion information, second conversion information and third conversion information corresponding to the search term feature, the keyword feature and the value feature respectively; and performing splicing processing on the first conversion information, the second conversion information and the third conversion information to obtain the combined conversion information.

Clause 7: The method according to Clause 2, wherein using the second neural network to process the speech signal to obtain the second feature information corresponding to the speech signal, comprises: determining a value feature corresponding to the speech signal; and processing the value feature using a static memory network to obtain the second feature information.

Clause 8: The method according to Clause 7, wherein using the static memory network to process the value feature to obtain the second feature information, comprises: obtaining filtering parameters corresponding to the static memory network; determining representation information corresponding to the value feature; and analyzing and processing the representation information using the static memory network and the filtering parameters to obtain the second feature information corresponding to the speech signal.

Clause 9: The method according to any one of Clauses 1-8, wherein determining the target feature information used to represent the semantics in the speech signal based on the first feature information and the second feature information, comprises: determining a sum of the first feature information and the second feature information as the target feature information.

Clause 10: The method according to any one of Clauses 1-8, wherein after determining the target feature information used to represent the semantics in the speech signal, the method further comprises: sending the target feature information to a decoder, to allow the decoder to analyze and process the target feature information to obtain text information corresponding to the speech signal.

Clause 11: A speech processing method, comprising: obtaining a speech signal to be processed; using a first neural network to process the speech signal to obtain first feature information corresponding to the speech signal, wherein the first feature information is used to identify semantics in the speech signal; using a second neural network to process the speech signal to obtain second feature information corresponding to the speech signal, wherein the second feature information is used to identify the semantics in the speech signal, and the second feature information is different from the first feature information; and determining target feature information used to represent the semantics in the speech signal based on the first feature information and the second feature information.

Clause 12: The method according to Clause 11, wherein: the first neural network includes a self-attention mechanism, and the second neural network includes a static memory network.

Clause 13: The method according to Clause 12, wherein using the first neural network to process the speech signal to obtain the first feature information corresponding to the speech signal, comprises: determining speech feature information corresponding to the speech signal, wherein the speech feature information includes at least one of: a search term feature, a keyword feature, and a value feature; and processing the speech feature information based on the self-attention mechanism to obtain the first feature information.

Clause 14: The method according to Clause 13, wherein, when the speech feature information includes: the search term feature, the keyword feature and the value feature, processing the speech feature information based on the self-attention mechanism to obtain the first feature information, comprises: obtaining combined conversion information corresponding to the search term feature, the keyword feature, and the value feature, wherein the combined conversion information includes conversion information corresponding to the search term feature, and conversion information corresponding to the keyword feature, and conversion information corresponding to the value feature; using a self-attention mechanism to process the search term feature, the keyword feature, and the value feature, and determining a number of attention mechanisms corresponding to the speech signal; and obtaining the first feature information corresponding to the speech signal based on the number of the attention mechanisms and the combined conversion information.

Clause 15: The method according to Clause 14, wherein obtaining the first feature information corresponding to the speech signal based on the number of the attention mechanisms and the combined conversion information, comprises: using a concatenation function to combine all the attention mechanisms to obtain combined information corresponding to the attention mechanisms, wherein the concatenation function is used to connect strings; and determining a product of the combined information and the combined conversion information as the first feature information corresponding to the speech signal.

Clause 16: The method according to Clause 14, wherein obtaining the combined conversion information corresponding to the search term feature, the keyword feature, and the value feature comprises: obtaining first conversion information, second conversion information, and third conversion information corresponding to the search term feature, the keyword feature and the value feature respectively; and performing splicing processing on the first conversion information, the second conversion information, and the third conversion information to obtain the combined conversion information.

Clause 17: The method according to Clause 12, wherein using the second neural network to process the speech signal to obtain the second feature information corresponding to the speech signal, comprises: determining a value feature corresponding to the speech signal; and using a static memory network to process the value feature to obtain the second feature information.

Clause 18: The method according to Clause 17, wherein using the static memory network to process the value feature to obtain the second feature information, comprises: obtaining filtering parameters corresponding to the static memory network; determining representation information corresponding to the value feature; and analyzing and processing the representation information using the static memory network and the filtering parameters to obtain the second feature information corresponding to the speech signal.

Clause 19: The method according to any one of Clauses 11-18, wherein determining the target feature information used to represent the semantics in the speech signal based on the first feature information and the second feature information, comprises: setting a sum of the first feature information and the second feature information as the target feature information.

Clause 20: The method according to any one of Clauses 11-18, wherein: after determining the target feature information used to represent the semantics in the speech signal, the method further comprises: sending the target feature information to a decoder, to allow the decoder to analyze and process the target feature information to obtain text information corresponding to the speech signal.

Clause 21: A speech processing method, comprising: receiving target feature information sent by a encoder, wherein the target feature information corresponds to a speech signal; obtaining historical forecast information; and processing the target feature information using a multi-head attention mechanism and the historical prediction information to obtain text information corresponding to the speech signal.

Clause 22: A speech encoder, comprising: a first acquisition unit configured to obtain a speech signal to be processed; a first processing unit configured to process the speech signal using a first neural network to obtain first feature information corresponding to the speech signal, wherein the first feature information is used to identify semantics in the speech signal; the first processing unit further configured to process the speech signal using a second neural network to obtain second feature information corresponding to the speech signal, wherein the second feature information is used to identify the semantics of the speech signal, and the second feature information is different from the first feature information; and a first determination unit configured to determine target feature information used to represent the semantics in the speech signal based on the first feature information and the second feature information.

Clause 23: An electronic device, comprising: a memory and a processor, the memory being used to store one or more computer instructions, wherein: the one or more computer instructions, when executed by the processor, implement the speech processing method according to any one of Clauses 11-20.

Clause 24: A speech decoder, comprising: a second receiving module configured to receive target feature information sent by an encoder, wherein the target feature information corresponds to a speech signal; a second acquisition module configured to obtain historical prediction information; a second processing module configured to process the target feature information using a multi-head attention mechanism and the historical prediction information to obtain text information corresponding to the speech signal.

Clause 25: An electronic device, comprising: a memory and a processor, the memory being used to store one or more computer instructions, wherein: the one or more computer instructions, when executed by the processor, implement the speech processing method according to Clause 21.

Clause 26: A speech recognition system, comprising: the speech encoder according to claim 22, configured to perform data dimension reduction processing on an obtained signal to obtain speech feature information corresponding to the speech signal.

Clause 27: The system of Clause 26, further comprising: a speech decoder configured to receive the speech feature information sent by the speech encoder, and output text information corresponding to the speech signal based on the speech feature information.

Clause 28: The system of Clause 27, wherein the speech decoder is further configured to: obtain historical prediction information; and process the speech feature information using a multi-head attention mechanism and the historical prediction information to obtain the text information corresponding to the speech signal.

Clause 29: A speech encoder, comprising: a third acquisition module configured to obtain a speech signal to be processed; a third processing module configured to process the speech signal using a first neural network and a second neural network to obtain first feature information and second feature information corresponding to the speech signal respectively, wherein a computational efficiency of the first neural network is higher than a computational efficiency of the second neural network, and an accuracy of the second feature information outputted by the second neural network is higher than an accuracy of the first feature information outputted by the first neural network; and a third determination module configured to determine target feature information used to represent semantics in the speech signal based on the first feature information and the second feature information.

Clause 30: An electronic device, comprising: a memory and a processor, the memory being used to store one or more computer instructions, wherein: the one or more computer instructions, when executed by the processor, implement the speech processing method according to any one of Clauses 1-10.

Clause 31: A speech recognition system, comprising: the speech encoder according to Clause 29, configured to perform data dimension reduction processing on an obtained speech signal to obtain speech feature information corresponding to the speech signal.

What is claimed is:
1. A method implemented by a computing device, comprising:
  obtaining a speech signal to be processed;
  using a first neural network to process the speech signal to obtain first feature information corresponding to the speech signal, wherein the first feature information is used to identify semantics in the speech signal;
  using a second neural network to process the speech signal to obtain second feature information corresponding to the speech signal, wherein:
    the second feature information is used to identify the semantics in the speech signal,
    the second feature information is different from the first feature information,
    the second neural network includes a static memory network, and
    using the second neural network to process the speech signal to obtain the second feature information corresponding to the speech signal, comprises:
      determining a value feature corresponding to the speech signal; and
      using the static memory network to process the value feature to obtain the second feature information; and
  determining target feature information used to represent the semantics in the speech signal based on the first feature information and the second feature information.

2. The method according to claim 1, wherein the first neural network includes a self-attention mechanism.

3. The method according to claim 2, wherein using the first neural network to process the speech signal to obtain the first feature information corresponding to the speech signal comprises:
   determining speech feature information corresponding to the speech signal, wherein the speech feature information includes at least one of: a search term feature, a keyword feature, and a value feature; and
   processing the speech feature information based on the self-attention mechanism to obtain the first feature information.

4. The method according to claim 3, wherein, when the speech feature information includes: the search term feature, the keyword feature, and the value feature, processing the speech feature information based on the self-attention mechanism to obtain the first feature information, comprises:
   obtaining combined conversion information corresponding to the search term feature, the keyword feature, and the value feature, wherein the combined conversion information includes conversion information corresponding to the search term feature, conversion information corresponding to the keyword feature, and conversion information corresponding to the value feature;
   using the self-attention mechanism to process the search term feature, the keyword feature, and the value feature, and determining a number of attention mechanisms corresponding to the speech signal; and
   obtaining the first feature information corresponding to the speech signal based on the number of the attention mechanisms and the combined conversion information.

5. The method according to claim 4, wherein obtaining the first feature information corresponding to the speech signal based on the number of the attention mechanisms and the combined conversion information, comprises:
   using a concatenation function to combine all the attention mechanisms to obtain combined information corresponding to the attention mechanisms, wherein the concatenation function is used to connect strings; and
   determining a product of the combined information and the combined conversion information as the first feature information corresponding to the speech signal.

6. The method according to claim 4, wherein obtaining the combined conversion information corresponding to the search term feature, the keyword feature and the value feature comprises:
   obtaining first conversion information, second conversion information and third conversion information corresponding to the search term feature, the keyword feature and the value feature respectively; and
   performing splicing processing on the first conversion information, the second conversion information and the third conversion information to obtain the combined conversion information.

7. The method according to claim 1, wherein using the static memory network to process the value feature to obtain the second feature information, comprises:
   obtaining filtering parameters corresponding to the static memory network;
   determining representation information corresponding to the value feature; and
   analyzing and processing the representation information using the static memory network and the filtering parameters to obtain the second feature information corresponding to the speech signal.

8. The method according to claim 1, wherein determining the target feature information used to represent the semantics in the speech signal based on the first feature information and the second feature information, comprises:
   determining a sum of the first feature information and the second feature information as the target feature information.

9. The method according to claim 1, wherein after determining the target feature information used to represent the semantics in the speech signal, the method further comprises:
   sending the target feature information to a decoder, to allow the decoder to analyze and process the target feature information to obtain text information corresponding to the speech signal.

10. One or more non-transitory computer readable media storing executable instructions that, when executed by one or more processors, cause the one or more processors to perform acts comprising:
    obtaining a speech signal to be processed;
    using a first neural network to process the speech signal to obtain first feature information corresponding to the speech signal, wherein the first feature information is used to identify semantics in the speech signal;
    using a second neural network to process the speech signal to obtain second feature information corresponding to the speech signal, wherein:
      the second feature information is used to identify the semantics in the speech signal,
      the second feature information is different from the first feature information,
      the second neural network includes a static memory network, and
      using the second neural network to process the speech signal to obtain the second feature information corresponding to the speech signal, comprises:
        determining a value feature corresponding to the speech signal; and
        using the static memory network to process the value feature to obtain the second feature information; and
    determining target feature information used to represent the semantics in the speech signal based on the first feature information and the second feature information.

11. The one or more non-transitory computer readable media according to claim 10, wherein the first neural network includes a self-attention mechanism.

12. The one or more non-transitory computer readable media according to claim 11, wherein using the first neural network to process the speech signal to obtain the first feature information corresponding to the speech signal, comprises:
    determining speech feature information corresponding to the speech signal, wherein the speech feature information includes at least one of: a search term feature, a keyword feature, and a value feature; and
    processing the speech feature information based on the self-attention mechanism to obtain the first feature information.

13. The one or more non-transitory computer readable media according to claim 12, wherein, when the speech feature information includes: the search term feature, the keyword feature and the value feature, processing the speech feature information based on the self-attention mechanism to obtain the first feature information, comprises:

obtaining combined conversion information corresponding to the search term feature, the keyword feature, and the value feature, wherein the combined conversion information includes conversion information corresponding to the search term feature, and conversion information corresponding to the keyword feature, and conversion information corresponding to the value feature;

using a self-attention mechanism to process the search term feature, the keyword feature, and the value feature, and determining a number of attention mechanisms corresponding to the speech signal; and obtaining the first feature information corresponding to the speech signal based on the number of the attention mechanisms and the combined conversion information.

14. The one or more non-transitory computer readable media according to claim 13, wherein obtaining the first feature information corresponding to the speech signal based on the number of the attention mechanisms and the combined conversion information, comprises:

using a concatenation function to combine all the attention mechanisms to obtain combined information corresponding to the attention mechanisms, wherein the concatenation function is used to connect strings; and determining a product of the combined information and the combined conversion information as the first feature information corresponding to the speech signal.

15. The one or more non-transitory computer readable media according to claim 13, wherein obtaining the combined conversion information corresponding to the search term feature, the keyword feature, and the value feature comprises:

obtaining first conversion information, second conversion information, and third conversion information corresponding to the search term feature, the keyword feature and the value feature respectively; and performing splicing processing on the first conversion information, the second conversion information, and the third conversion information to obtain the combined conversion information.

16. The one or more non-transitory computer readable media according to claim 10, wherein using the static memory network to process the value feature to obtain the second feature information, comprises:

obtaining filtering parameters corresponding to the static memory network;

determining representation information corresponding to the value feature; and analyzing and processing the representation information using the static memory network and the filtering parameters to obtain the second feature information corresponding to the speech signal.

17. The one or more non-transitory computer readable media according to claim 10, wherein determining the target feature information used to represent the semantics in the speech signal based on the first feature information and the second feature information, comprises:

setting a sum of the first feature information and the second feature information as the target feature information.

18. An encoder comprising:

one or more processors; and memory storing executable instructions that, when executed by the one or more processors, cause the one or more processors to perform acts comprising:

obtaining a speech signal to be processed;

using a first neural network to process the speech signal to obtain first feature information corresponding to the speech signal, wherein the first feature information is used to identify semantics in the speech signal;

using a second neural network to process the speech signal to obtain second feature information corresponding to the speech signal, wherein:

the second feature information is used to identify the semantics in the speech signal, the second feature information is different from the first feature information, the second neural network includes a static memory network, and using the second neural network to process the speech signal to obtain the second feature information corresponding to the speech signal, comprises:

determining a value feature corresponding to the speech signal; and using the static memory network to process the value feature to obtain the second feature information; and determining target feature information used to represent the semantics in the speech signal based on the first feature information and the second feature information.

* * * * *